United States Patent

[11] 3,611,435

[72] Inventor Bernard Cooper
Fair Lawn, N.J.

[21] Appl. No. 809,921
[22] Filed Mar. 24, 1969
[45] Patented Oct. 5, 1971
[73] Assignee International Telephone and Telegraph Corporation
Nutley, N.J.

[54] SATELLITE COMMUNICATION SYSTEM
28 Claims, 28 Drawing Figs.

[52] U.S. Cl. .......... 325/6,
325/4, 325/8, 343/7.5
[51] Int. Cl. .......... H04b 7/20
[50] Field of Search .......... 325/4, 58,
6; 178/69.5 DC; 343/5 DP, 7.5, 7, 100 ST

[56] References Cited
UNITED STATES PATENTS 3,453,592 7/1969 Ishii .......... 340/146.1

*Primary Examiner*—Robert L. Griffin
*Assistant Examiner*—Kenneth W. Weinstein
*Attorneys*—C. Cornell Remsen, Jr., Walter J. Baum, Percy P. Lantzy, Philip M. Bolton, Isidore Togut and Charles L. Johnson, Jr.

ABSTRACT: Data time delay compensation is employed to establish a constant and equal signal path delay or length between a satellite and earth terminal on both the up and down links dependent of satellite motion. In a ground terminal, a digital data bit stream conveying information is applied to a first variable time delay circuit prior to transmission and also to a second variable time delay circuit. After passing through the satellite, a digital-analog autocorrelator receives the data stream from the satellite and also from the second variable delay circuit to produce a control signal to control, in opposite directions, the delay of the first and second variable delay circuits to maintain a constant length up link. A third variable time delay circuit is coupled to the output of the terminal receiver and is controlled by the autocorrelator, in the same sense as the first variable delay circuit, to maintain the down link constant and equal in length to the up link. Each of the variable delay circuits include magnetic core storage means with read-in and readout control with the time delay control of the data stream being provided by a readout bistable circuit wherein the bits of the data stream have their widths appropriately adjusted. The employment of a backward counting binary counter is provided in the delay circuits whose count is preset to bring the delay between the data streams into the correlator into the control range of the autocorrelator. Duplication of the above equipment in the terminal can be employed for instantaneous handover to another mutually visible satellite. At least a second terminal including duplicate equipment for data time delay compensation will enable two-way communication through any mutually visible satellite, time-division multiple access to a mutually visible satellite by the terminals involved and instantaneous communication handover to another mutually visible satellite.

INVENTOR
BERNARD COOPER
BY Alfred C. Hill
AGENT

INVENTOR
BERNARD COOPER
BY Alfred C. Hill
AGENT

Fig. 3
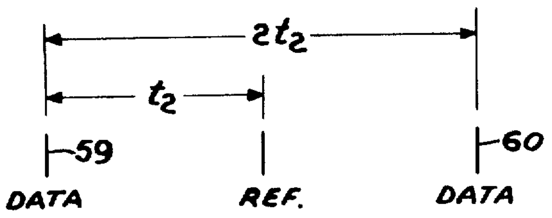
Fig. 4
TRUTH TABLES
| AND | | | XOR | | | NXOR | | |
|---|---|---|---|---|---|---|---|---|
| A | B | Y | A | B | Y | A | B | Y |
| 1 | 1 | 1 | 0 | 0 | 0 | 0 | 0 | 1 |
| 0 | 1 | 0 | 0 | 1 | 1 | 0 | 1 | 0 |
| 1 | 0 | 0 | 1 | 0 | 1 | 1 | 0 | 0 |
| 0 | 0 | 0 | 1 | 1 | 0 | 1 | 1 | 1 |
Fig. 5
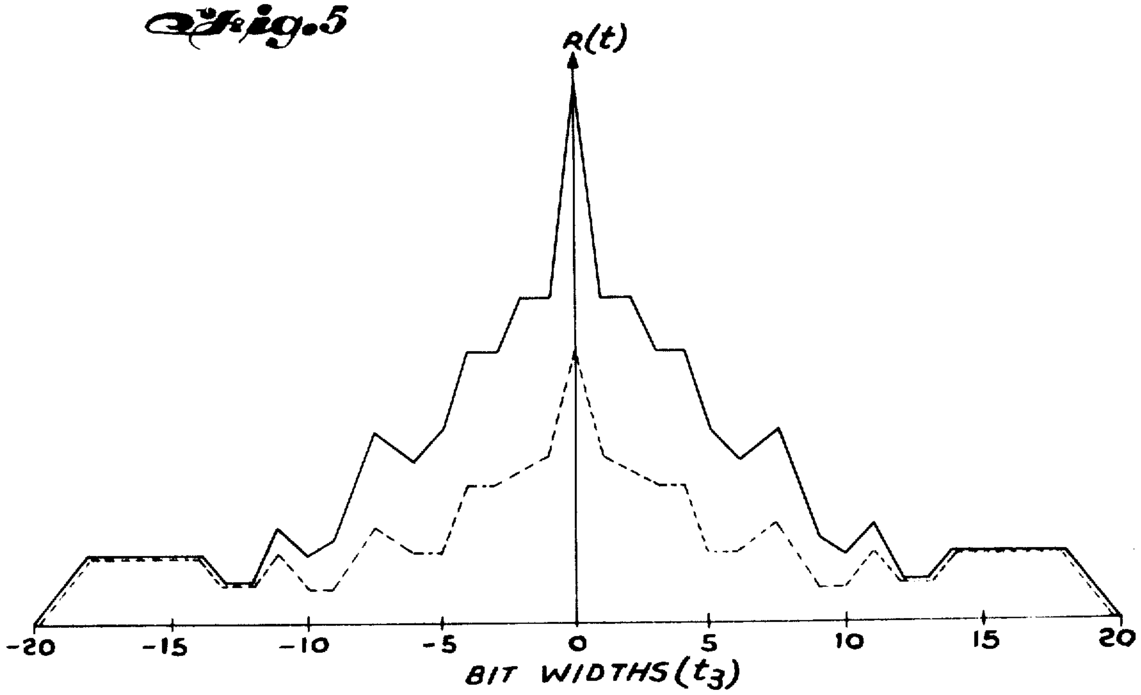
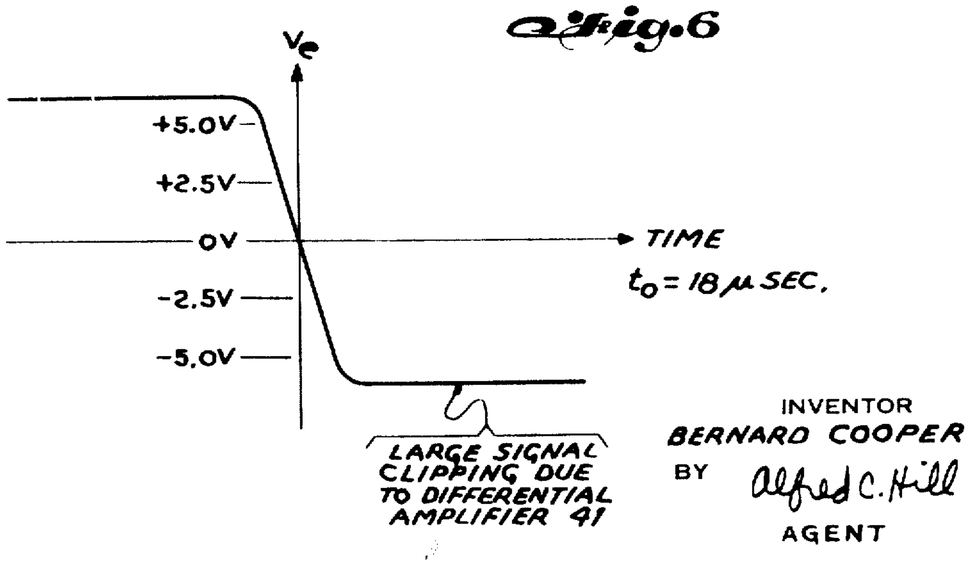
Fig. 6
INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BENARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT INVENTOR
BERNARD COOPER
BY Alfred C. Hill
AGENT

SATELLITE COMMUNICATION SYSTEM

BACKGROUND OF THE INVENTION

This invention relates to communication systems and more particularly to satellite communication systems employable with synchronous satellites and nonsynchronous satellites, such as medium altitude satellites and near synchronous satellites.

U.S. Pat. No. 3,349,398 issued to Andrew M. Werth, assigned to the same assignee as the present application, describes fully a time delay compensation arrangement, particularly useful for instantaneous handover from one satellite mutually visible to two ground stations and a second satellite which is mutually visible to the two ground stations without loss of time or data. The above-mentioned U.S. patent describes the various handover techniques including delayed handover, fast handover and instantaneous handover and points out that instantaneous handover is the best form of handover techniques for high-speed data communications. There is also discussed the problems that had to be solved to implement instantaneous handover and one arrangement of the time delay compensation which overcomes these problems and enables the implementation of instantaneous handover. The implementation disclosed in this cited U.S. patent is called "range-measuring technique," wherein a data stream of relatively high bit rate is applied to a sampling register prior to being coupled to a digitally controlled delay line, the output of which is transmitted to a satellite. The satellite returns this data stream through a monitor receiver to the terminal. The sampling register output is compared with the transmitted data and when the sampled data and the transmitted data are found to be equal the range-measuring system is activated. The range-measuring system then continues its operation until the same sampled data is received from the monitoring receiver at which time the range-measuring system is stopped, the resultant count is divided by 2 and applies a digital control signal to the delay line in the transmission path and a digitally controlled delay line in the main receiver of the terminal so as to provide equal and constant up and down links between the terminal and the satellite. Another terminal visible to the satellite visible to the first terminal contains the same range-measuring system and appropriately adjusts and identical delay compensation arrangement so that the point-to-point path between the two terminals is appropriately adjusted according to the range information between the particular terminals and the mutually visible satellites. The range-measuring system is controlled at a given rate and thus within the limitation of this rate provides a constant up-and-down path link between the terminals and the satellite. Duplication of the range-measuring system and the digitally controlled transmission lines for the transmission and receiving paths in both the terminals will enable instantaneous handover between the first mutually visible satellite and a second mutually visible satellite. This range-measuring type of delay compensation makes the path lengths of the up and down links between each of the mutually visible satellites constant and equal regardless of satellite motion or Doppler effect within the limitations of the rate of operation of the range-measuring system. Due to this rate of operation of the range-measuring system, however, it cannot be said that the path lengths are continuously compensated for satellite motion, nor are the up and down links continuously made constant and equal in length, independent of satellite motion, which, of course, includes the Doppler effect.

SUMMARY OF THE INVENTION

An object of the present invention is to provide a satellite communication system employing data time delay compensation which is truly continuous in operation.

Another object of the present invention is to provide in a satellite communication system, data time delay compensation which maintains the up-and-down link between one earth terminal and a satellite constant and equal continuously independent of satellite motion including compensation for Doppler effect.

A further object of this invention is to provide a satellite communication system employing data time delay compensation which will enable the maintenance of a constant equal up-and-down path length link between the terminal station and the satellite which when employed in a plurality of ground stations will enable the control of the transmitting and receiving path lengths to enhance time-division multiple access to the satellite by the plurality of ground terminals.

Still a further object of this invention is to provide a satellite communication system employing duplicate data time delaying compensation arrangements in a ground station to facilitate instantaneous handover from one satellite to another satellite.

Another further object of this invention is to provide a satellite communication system incorporating time delay compensation equipment in at least two ground stations mutually visible to a first satellite to enable each of the terminals to provide constant and equal length up and down communication links. Duplicate time delay compensation equipment in each of the terminals provides for each terminal equal and constant up-and-down link lengths to a second mutually visible satellite to enable instantaneous handover from the first mutually visible satellite to the second mutually visible satellite.

A feature of this invention is the provision of a satellite communication system comprising: at least a first satellite; and at least a first terminal disposed in communication relationship with the first satellite establishing at least a first communication path between the first terminal and the first satellite; the first terminal including a first source of a first digital data bit stream, first means coupled to the first source capable of controlling the time relationship of the first stream transmitted to the first satellite, second means coupled to the first source capable of controlling time relationship of the first stream, and third means, coupled to the second means, the first means and the first satellite, responsive to the first stream from the second means and the first stream received from the first satellite for controlling the first and second means to maintain the length of the first communication path constant.

Another feature of this invention is the provision of a satellite communication system incorporating additionally in the above-mentioned first terminal fourth means coupled to the first satellite establishing a second communication path between the first satellite and the first terminal for a second digital data bit stream, and fifth means coupled to the fourth means and the third means responsive to the output of the third means to control the time relationship of the second stream at the output of the fifth means to maintain the length of the second communication paths constant and equal to the length of the first communication path.

A further feature of this invention is the provision of a variable time delay system incorporated in the satellite communication system comprising a first source of a digital data bit stream; a digital variable time delay means coupled to the first source; a second source of the data stream having a varied time relationship with respect to the data stream at the output of the first source; and digital-analog autocorrelation means, coupled to the delay means and the second source, responsive to the data stream from both the delay means and the second source to control the time delay of the delay means to maintain the data stream from the delay means time coincident with the data stream from the second source.

BRIEF DESCRIPTION OF THE DRAWING

The above-mentioned and other features and objects of this invention will become more apparent by reference to the following description taken in conjunction with the accompanying drawings, in which:

FIG. 3 is a timing diagram illustrating the operation of the fixed delay units of FIG. 2;

FIG. 4 illustrates the truth tables for an AND gate, an EXCLUSIVE OR gate and a NEGATIVE EXCLUSIVE OR gate that may be employed in the digital multiplier of FIG. 2;

FIG. 5 is a diagram comparing the autocorrelation function obtainable with an AND gate digital multiplier and a NEGATIVE EXCLUSIVE OR gate digital multiplier in the subsystem of FIG. 2;

FIG. 6 is a curve illustrating the control characteristic of the delay control subsystem of FIG. 2;

DESCRIPTION OF THE PREFERRED EMBODIMENT

The description of the data time delay compensation arrangement, or, as it has become know, the data buffering system, which follows will employ numerical values for certain rates, times and delays present in the system. It is to be understood that these specific values are by way of example only and may be appropriately modified to meet specifications for other systems when employing the techniques of this invention.

Figure 1:
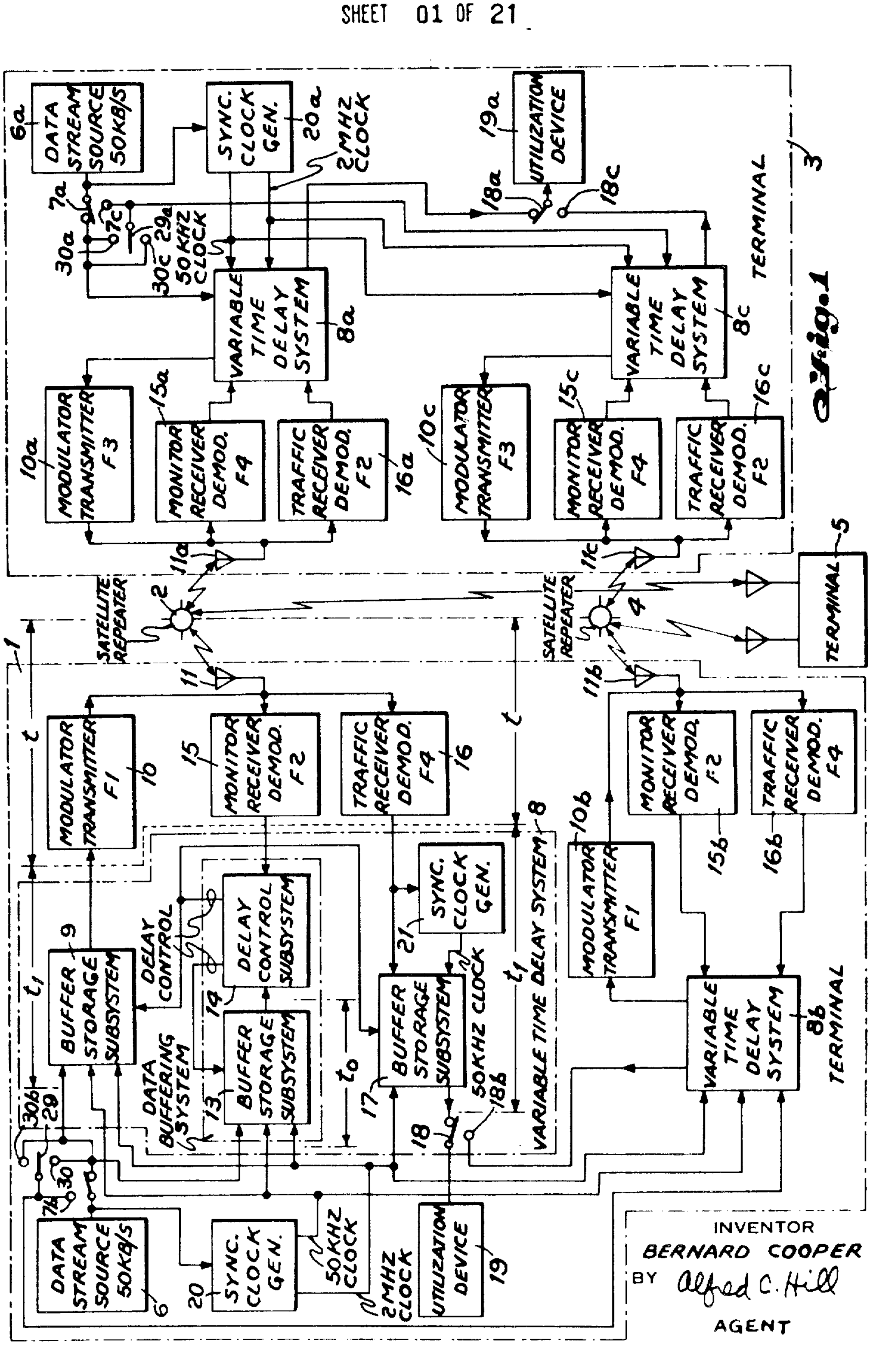
FIG. 1 is a block diagram of a satellite communication system incorporating the data time delay compensation arrangement in accordance with the principles of this invention.

Referring to FIG. 1, there is illustrated therein a satellite communication system in accordance with the principles of this invention. The system includes terminal 1 in communication with terminal 3 through satellite 2. Satellite 2 is a repeater satellite. Each of terminals 1 and 3 will include the time delay compensation arrangement of this invention and will, independently of each other, maintain the up-and-down link to satellite 2 equal and constant independent of satellite motion including Doppler effect. A plurality of ground terminals, such as terminals 1, 3 and 5, each including the time delay compensation arrangement of this invention will control the transmission and reception of the signals so that the ground stations can have time-division multiple access to satellite 2, with the up link and down link between the various terminals being independently controlled by the time delay compensation arrangement included in these terminals. By duplicating the time delay compensation arrangement in each of the terminals 1, 3 and 5, it is possible to provide instantaneous communication handover from mutually visible satellite 2 to mutually visible satellite 4 wherein the time delay compensation arrangement makes the up link and down link of satellite 4 to the various ground terminals constant and equal to the up link and down link of these terminals to satellite 2 just prior to the handover and then after handover maintains the up link and down link between the various terminals and satellite 4 constant and equal regardless of the motion of satellite 4 and the Doppler effect produced by this motion. Once the handover to satellite 4 has been accomplished, for the plurality of ground terminals can be controlled to have time-division multiple access to satellite 4.

Consider now terminal 1. Source 6 provides a 50 KB/S (kilobits per second) data stream conveying intelligence which is coupled through switch 7, in the position illustrated, to variable time delay system 8. System 8 includes buffer storage subsystem 9 coupled to source 6. The output of subsystem 9 is coupled to modulator-transmitter 10 to transmit the data stream to satellite 2 via antenna 11 at a carrier frequency F1. The output from source 6 is also coupled to data buffering system 12 including therein buffer storage subsystem 13 and delay control subsystem 14. The signal transmitted from transmitter 10 to satellite 2 is returned by satellite 2 at a carrier frequency F2 to the monitor receiver-demodulator 15 whose output is coupled to subsystem 14. Subsystem 14 is effectively an autocorrelator which produces a delay control signal for coupling to subsystem 9 and subsystem 13 to adjust the time delay of these subsystems in the opposite directions to maintain the length of the up link from terminal 1 to satellite 2 constant independent of satellite motion and Doppler effect. Traffic transmitted from terminal 3 through satellite 2 is transmitted via satellite 2 at a carrier frequency F4 and is received via antenna 11 and coupled to traffic receiver-demodulator 16 whose output is coupled to buffer storage subsystem 17. The delay control output from subsystem 14 coupled to subsystem 9 is also coupled to subsystem 17 to maintain the length of the down link from satellite 2 to terminal 1 constant and equal to the up link from terminal 1 to satellite 2. It should be noted at this point that subsystem 14 controls subsystems 9 and 17 in a delay direction opposite to the control of the delay of subsystem 13 so as to maintain the up link and down link between terminal 1 and satellite 2 equal and constant independent of satellite motion including Doppler effect. The output from subsystem 17 is coupled through switch 18, in the positions illustrated, to utilization device 19 to recover and use the traffic intelligence transmitted from terminal 3.

The heart of the delay compensation arrangement in accordance with the principles of this invention is the data buffering system 12 which dynamically aligns two identical 50 KB/S binary data streams, one received from source 6 and the other received from receiver 15 to within ±5 percent of a bit width. The equal and opposite delay control signals produced by subsystem 14 of system 12 controls subsystems 9 and 17 equal and opposite to the delay control of subsystem 13 so as to maintain the up-and-down link from terminal 1 to satellite 2 constant and equal.

In accordance with the principles of this invention, it is desired that:

$t_1+t=\text{constant}=T$ (1), where $t_1$=delay introduced by subsystem 9 or subsystem 17 and $t$=one-way path delay between terminal 1 and satellite 2. This is required to be true regardless of the value $t$. Therefore:

$t_1+dt_1+t+dt=T$ (1*a*), where $d$=an incremental change. Therefore, it is clear that $dt_1=-dt$ (2)

Control subsystem 14 will maintain the following relationship:

$t_o+d_{to}=t_1+dt_1+2t+2dt$ (3)

where $t_o$=delay introduced by subsystem 13. But, $t_o=t_1+2t$ (initial condition).

Thus, $dt_o=dt_1+2dt$ (4)

Using equation (2) in equation (4)

$dt_o=dt$.

Thus, to satisfied equations (1) and (1*a*)

$dt_o=dt=-dt_1$ (5)

Clearly, the value of $T$ is given by $T=t_{max}+t_{1\,min}$ (6)

The value of $t_o$ is found from $t_{o\,max}=T+t_{max}$ (7)

As shown above, the relationship of equation (1) will be maintained by this system for both the up-and-down link if $dt_o=dt=-dt_1$. That is, by shifting the delay of subsystems 9 and 17 by amounts equal and opposite to the shift in the delay in subsystem 13, a fixed signal path length can be maintained. Clearly, the delay variation capability of subsystems 9, 13 and 17 must be at least as great as the maximum variation of $t$. Furthermore, the value of $T$ as given above by equation (6) completely defines $T$, in that, $t_{1\,min}$=180 microseconds for the buffer storage subsystem employed in this example of the operation of the system of this invention. This relationship establishes the minimum value of fixed one-way signal delay T for the system.

As a specific example, showing the values of delay required of the various storage subsystems 9, 13 and 17, consider the near synchronous satellite case. For this case $t_{max}$=130.0 milliseconds; $t_{min}$=113.4 milliseconds; and $t_{1\ min}$=0.180 milliseconds. Therefore, using equation (6) $T$=133.18 milliseconds. Using equation (7) $t_{o\ max}$=133.18+133.0=266.18 milliseconds. Also, $dt = dt_o = dt_1$ =39.6 milliseconds, max.

To provide proper operation, it is necessary that two clock signals be provided to each subsystem 9, 13 and 17, namely, a 2 Mhz (megahertz) reference clock and a 50 kHz. (kilohertz) write clock. In each of the subsystems 9, 13 and 17, the 50 kHz. clock is used to write data into the subsystem and the 2 MHz clock is used to establish the 0.5-microsecond delay-change increment and the absolute delay reference for system 12.

The 2 MHz reference clock for subsystems 9, 13 and 17 are derived from the traffic output data stream from source 6 in generator 20. The 50 kHz. write clocks for buffers 9 and 13 are also derived from traffic output data stream of source 6 in generator 20. However, the 50 kHz. write clock for subsystem 17 is derived from the received traffic output of receiver 16 in generator 21. In this way, subsystem 17 will be able to write in at the Doppler-shifted rate, and read out at a rate that includes appropriate corrections for satellite range and range rate variations. The required delay accuracy is ±1 microseconds. Since a reference delay of approximately 250 milliseconds must be established, and ±1 microseconds represents ±1 part in 250 $\times 10^3$ microseconds, it is desirable that the traffic output data used to derive the 2 MHz clock from source 6 have an absolute accuracy of ±5 parts in 250 $\times 10^4$ or ±2 in $10^6$.

A synchronous 2 MHz clock can be derived from the 50 kHz. data signal from source 6 by employing phase lock techniques wherein a 2 MHz voltage controlled oscillator is phase locked to the 50 kHz. data by control generated from a 50 kHz. phase comparison as will be described in further detail hereinbelow with reference to FIG. 7.

Figure 8:
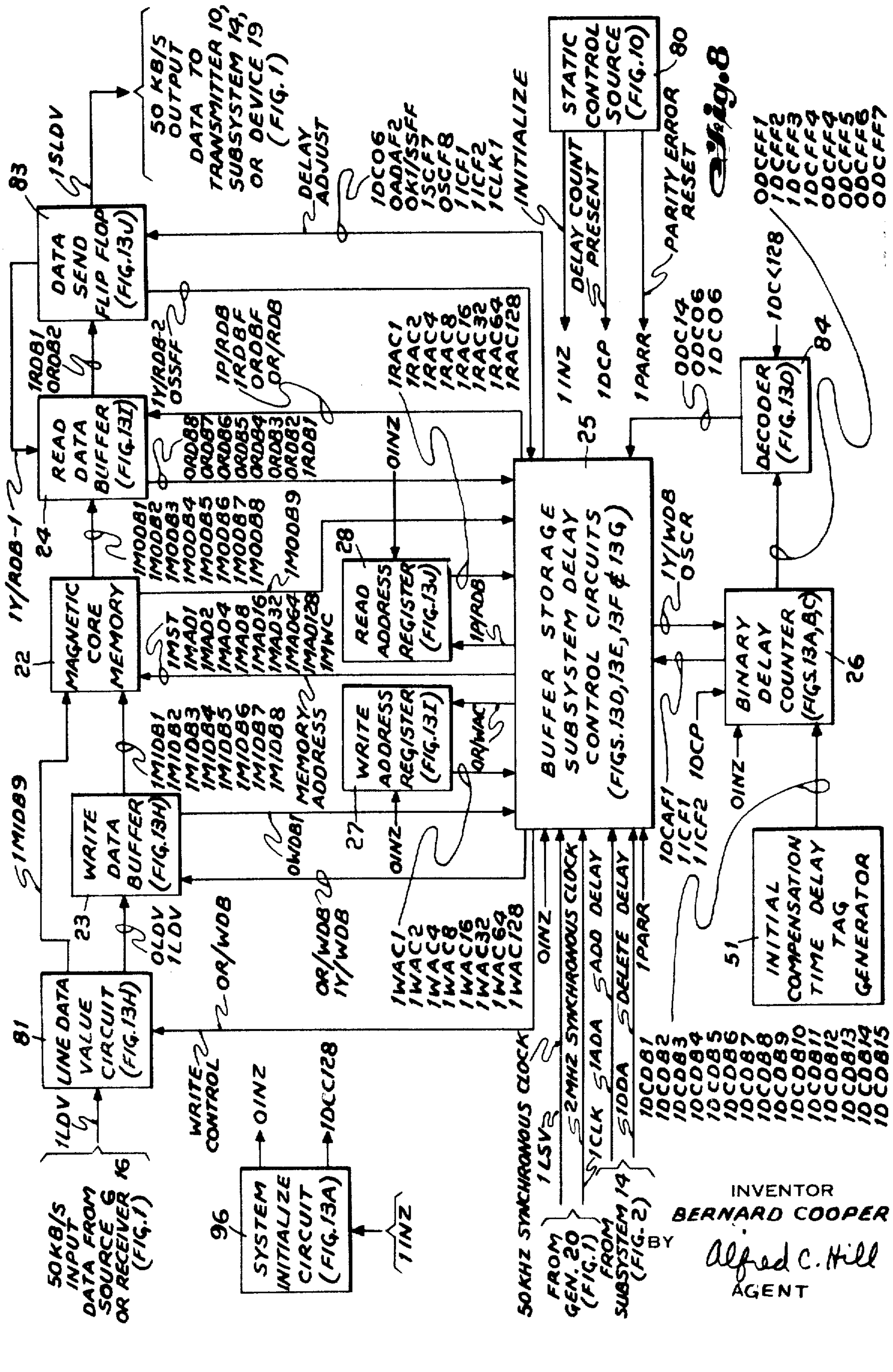
FIG. 8 is a block diagram of the buffer storage subsystem of FIG. 1 in accordance with the principles of this invention.

Subsystems 9, 13 and 17 are substantially identical and the block diagram thereof is illustrated in FIG. 8 and described in detail hereinbelow. However, it should be noted that the subsystem requirements are as follows. In subsystem 9 and 17, $t_{1\ max}$=39.6+0.18=39.78 milliseconds and $t_{1\ min}$=0.18 milliseconds, while in subsystem 13 $t_{o\ max}$=266.18 milliseconds and $t_{o\ min}$=226.58 milliseconds. Subsystems 9 and 17 are identical to subsystem 13 with the following exceptions. Subsystem 13 requires in magnetic core memory 22 (FIG. 8) a capacity of 2,048 words rather than the 256-word memories of subsystems 9 and 17. The number of bits per word remains the same, so that the buffers 23 and 24 and the control logic circuits 25 remain essentially the same. The only changes are in the initial delay increment counter 26 and the address registers 27 and 28 for subsystem 13. To obtain initial delays between 226 and 267 microseconds, counter 26 requires three additional stages. This will increase the initial delay change from 40 to 320 milliseconds, thereby covering the desired range. The address registers 27 and 28 will require the addition of three additional stages to accommodate the 2,048-word capacity. It would be possible for the subsystems 9 and 17 to share common delay counters and address register circuitry.

Control subsystem 14 provides a delay control output in the form of commands to add or delete delay in 0.5-microsecond steps and is used to control all three storage subsystems 9, 13 and 17. To conform with the operational concept of the present invention, when $dt$ is positive, $dt_o$ will be positive, that is, delay is added to storage subsystem 13, and $dt_1$ will be negative, that is, delay is deleted from subsystems 9 and 17.

Terminal 3 will include the same components as described hereinabove with respect to terminal 1. Source 6a will provide a data stream of 50 KB/X conveying intelligence which is coupled through switch 7a, in the position illustrated, to system 8a and, hence, to modulator-transmitter 10a for transmission from antenna 11a to satellite 2 at a carrier frequency of F3. Satellite 2 will retransmit this data stream to monitor receiver-demodulator 15a at a carrier frequency F4 and also to receiver 16 of terminal 1 to establish part of a two-way communication system from terminal 3 to terminal 1 through satellite 2. The other portion of the two-way communication system is provided by traffic receiver-demodulator 16a in terminal 3 which receives the data stream from transmitter 10 of terminal 1 through satellite 2 which retransmits this data stream at a carrier frequency of F2 for coupling through system 8a and, hence, to utilization device 19a through switch 18a, in the position illustrated. System 8a will include the same components as illustrated in terminal 1 and described hereinabove to maintain the length of the up link between terminal 3 and satellite 2 constant and equal to the length of the down link between satellite 2 and terminal 3 independent of satellite motion including Doppler effect.

The foregoing discussion has, of course, been made with satellite 2 being mutually visible to both terminals 1 and 3. In nonsynchronous satellite systems, satellite 2 will eventually move out of the mutual visibility region of terminals 1 and 3 and it will be necessary to reestablish communication through another mutually visible satellite, such as satellite 4, without interrupting transmission. This can be accomplished in accordance with the principles of this invention by duplicating the equipment described hereinabove for terminals 1 and 3 and appropriately manipulating certain switches as will be described hereinbelow.

Consider terminal 1 first. Just prior to changing satellites, variable time delay system 8b must be activated to provide up and down communication links between terminal 1 and satellite 4, which is in the mutual visibility region between terminals 1 and 3, constant and electrically equal to the length of the up and down links between terminal 1 and satellite 2. This can be accomplished in one manner by moving switch 29 to position 30 so that the output from source 6 is coupled to system 8b to activate the system 12 and control subsystems 9, 13 and 17 so that the length of the up-and-down link between terminal 1 and satellite 4 is constant and equal in length to that of the up-and-down link between terminal 1 and satellite 2. Once this is established and indicated by an appropriate meter, or an appropriate comparison circuit, (not illustrated) switch 7 would then be moved to its contact 7b and switch 29 would be placed in its center position so that the data stream from source 6 now is provided through the communication path including satellite 4. Satellite 2 is no longer in the communication path.

There may eventually be a time when it is desired to have another satellite take the place of satellite 4 in a communication path between terminal 1 and terminal 3. Again, prior to the instantaneous handover, it will be necessary to reestablish the constant and equal up-and-down communication link to this new satellite and assure that this new path length between terminal 1 and the new satellite is constant and equal to the up and down links between terminal 1 and terminal 4. This can be accomplished, remembering that switch 7 is closed against contact 7b, by positioning switch 29 against contact 30b so that system 8 is activated from source 6 to control the time delay in the various subsystems 9, 13 and 17 to establish the required path length to the new satellite from terminal 1.

At handover, switch 18 would have to be properly positioned against contact 18b so that utilization device 19 is connected to system 8b.

Of course, terminal 3 would include similar equipment as described for terminal 1 to establish instantaneous handover between the satellite (satellite 2) leaving the mutual visibility region and a new satellite (satellite 4) in the mutual visibility region. Again, positioning switch 29a against contact 30a will enable the data stream of source 6a to activate system 8c to establish the desired length of up-and-down link between terminal 3 and satellite 4 just prior to handover. Once the up-and-down link between terminal 3 and satellite 4 is constant and equal to the length of the up-and-down link between terminal 3 and satellite 2, switch 7*a* would be positioned against contact 7*c* and switch 18*a* would be positioned against contact 18*c* so that the data stream from source 6*a* would be transmitted through system 8*c* and transmitter 10*c*, with the return data being received by receiver 15*c* to control the time delay of the delay compensation systems. The transmitted data stream from transmitter 10*c* would also be transmitted from satellite 4 to receiver 16*b* of terminal 1 to be eventually utilized in utilization device 19 through switch 18 positioned against contact 18*b*. The data from transmitter 10*b* of terminal 1 would be transmitted through satellite 4 and, hence, received at receiver 16*c* for application to system 8*c* for utilization in device 19*a* when switch 18*a* is closed against contact 18*c*.

To reestablish communication through variable time delay system 8*a* and its associated transmitters and receivers and a new satellite coming into the mutual visibility region, it would be necessary to first establish the proper length of up-and-down communication paths between terminal 3 and the new satellite prior to handover. This is accomplished, remembering that switch 7*a* is closed against contact 7*c*, by positioning switch 29*a* against contact 30*c* so that system 8*a* can provide the proper delay compensation to establish the desired requirements for the up and down links between terminal 3 and the new satellite. Once the proper lengths of communication links between terminal 3 and the new satellite have been established, the switchover equipment will return data source to system 8*a* via switch 7*a* in the position illustrated and utilization device 19*a* to system 8*a* via switch 18*a* in the position illustrated.

Terminal 5 would include identical equipment described hereinabove with respect to terminals 1 and 3, both to provide instantaneous handover between two mutually visible satellites and also to maintain the up-and-down link path length constant and equal. In addition, would adjust the timing so as to have multiple access, along with terminals 1 and 3, to the active satellite in the communication system.

Figure 2:
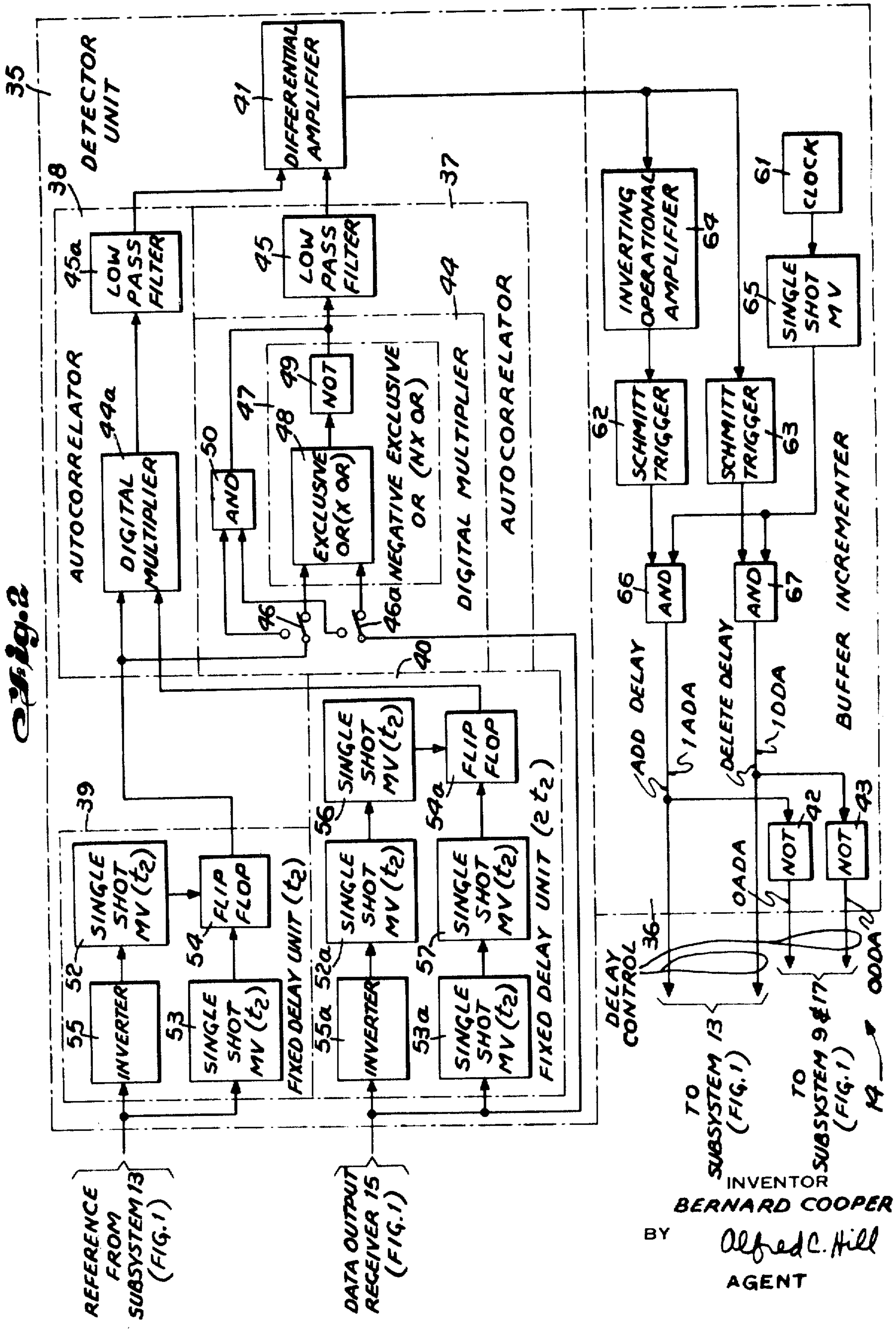
FIG. 2 is a block diagram of the delay control subsystem of FIG. 1.

Referring to FIG. 2, there is illustrated therein in block diagram form the components of delay control subsystem 14 of FIG. 1. Subsystem 14 employs a quasi-digital, or combined digital-analog, autocorrelator to generate an error control signal for closed-loop control. The control is generated by measuring the autocorrelation between two normally identical data streams, one from subsystem 13 and the other from receiver 15. The term "quasi-digital" is used here with reference to the method of digital multiplication and continuous, analog integration used to generate the delay error or control signal. Subsystem 14 compares the data stream emerging from the buffer storage subsystem 13 with a time-shifted version of the same data stream emerging from monitor receiver 15. It senses the magnitude and sign of the delay difference between these two data streams and generates a control signal which is sent back to storage subsystem 13 and also a control signal which is used to control subsystems 9 and 17. These control signals cause the buffer storage subsystems to change their time delay so that the delayed time difference between the two data streams coupled to subsystem 14 tend to zero.

Subsystem 14 is divided into two sections; a detector unit 35 which senses the delay difference, and buffer incrementer 36 which generates the appropriate correction signals.

Detector unit 35 includes a pair of autocorrelators 37 and 38, fixed delay unit 39 having a time delay equal to $t_2$, a fixed delay unit 40 having a time delay equal to the $2t_2$, and differential amplifier 41. The output of detector 35 is an analog voltage whose polarity indicates the direction of the delay difference and whose magnitude indicates the magnitude of the delay.

Buffer incrementer 36 is a threshold device with two input thresholds, two output lines to subsystem 13 and two output lines to subsystems 9 and 17. One threshold is positive and the other threshold is negative. When the input signal to incrementer 36 is between the two thresholds, no correction pulses are produced. When one of the thresholds is exceeded, pulses are sent to the subsystem 13 along the output line corresponding to that threshold. This same resultant output is coupled to subsystems 9 and 17 through NOT 42 or 43 coupled to the threshold output lines so that the subsystems 9 and 17 are controlled in an opposite direction with respect to the control of subsystem 13.

Subsystems 9, 13 and 17 are designed so that correction pulses on one line from incrementer 36 instruct the addition of delay and correction pulses on the other line instruct the deletion of delay. In this way the polarity of the output of incrementer 36 is used to determine the sense, or direction of the necessary delay correction.

Autocorrelators 37 and 38 each include digital multiplier 44 and low-pass filter 45 coupled thereto. The analog output of the integrators or filters 45 are coupled to differential amplifier 41 which subtract the output from the autocorrelators 37 and 38 to form the error signal. The fixed delay units 39 and 40 are employed to provide error direction sense.

Digital multipliers 44 may include a true digital multiplier in the form of an AND by properly positioning switches 46. The truth table for the AND is illustrated in FIG. 4. On the other hand, a more efficient logic may be employed as the digital multiplier in the form of a NEGATIVE EXCLUSIVE OR 47 which may be in the form of EXCLUSIVE OR 48 and NOT 49. The truth table for an EXCLUSIVE OR and a NEGATIVE EXCLUSIVE OR is also shown in FIG. 4. NEGATIVE EXCLUSIVE OR 47 can be placed in operation by properly positioning switches 46. Although, AND 50 is a perfectly good digital multiplier, NEGATIVE EXCLUSIVE OR 47 will increase the sensitivity of the system and decrease the effects of noise. The improvement is illustrated in FIG. 5 wherein the dotted line shows the autocorrelation function of the AND digital multiplier and the solid line illustrates the autocorrelation function of the NEGATIVE EXCLUSIVE OR digital multiplier. As illustrated in FIG. 5, the autocorrelation function obtained by NEGATIVE EXCLUSIVE OR 47 has two distinct advantages over the ordinary autocorrelation function of AND 50. Namely, (1) the solid line autocorrelation function is always greater than, or at worst, equal to the ordinary autocorrelation function. This is true because it contains all of the contributions of a coincidence of "1's" plus the contribution of the coincidence of two "0's"; and (2) there is no variation (noise) in the autocorrelator output shown by the solid line at $t_3$=0 because gate 47 does not distinguish between the coincidence of two "1's" and two "0's." This fact can be contrasted with the case of the autocorrelator output produced by AND 50 where the value at $t_3$=0 reflects the average signal power and, hence, is determined by the number of "1's" in the signal. Therefore, the use of gate 47 instead of gate 50 as a digital multiplier will result in a more sensitive error detector.

The statistics of the signals are such that, for very large delay-time differences, the autocorrelator outputs will be small and control will not be possible. Thus, if the delay-time difference exceeds a critical amount, the system will not be able to pull-in and lock onto the equal delay-time situation. It is expected that the initial compensation delay tag as produced by generator 51 contained in subsystems 9, 13 and 17 (FIG. 8) will be sufficient to bring subsystem 14 within the control or lock-in range. If, however, this is not true, an automatic scan and lock circuit can be employed (not shown). This circuitry would monitor the inputs to differential amplifier 41. Thus, it would be able to differentiate between a true null at the output of amplifier 41 and a complete loss of control signal. In the event that control is lost, the autoscan equipment would start a symmetrical time scan about the point at which control was lost. When control is reestablished, the autoscan would automatically disable itself.

The data bit streams handled by subsystem 14 are 50 KB/S nonreturn-to-zero waveforms. Therefore, the shortest possible time for which the signal will remain at one level is 20 microseconds. Advantage can be taken of this to build a delay element which senses and delays the transitions between voltage levels. Then, the delayed transitions can be recombined to construct a delayed replica of the original waveform. The fixed delay units of detector 35 are built on this principle. Delay unit 39 employs two single-shot multivibrators 52 and 53 to delay the transitions and flip-flop 54 to reconstruct the original waveform. Inverter 55 is necessary because single-shot multivibrator 52 must respond to negative transitions while single-shot multivibrator 53 must respond to positive transitions. Delay unit 40 includes inverter 55a and multivibrators 52a and 53a, identical to the components incorporated in delay unit 39. However, since the maximum delay obtainable with these two single-shot multivibrators is equal to the minimum time between two transitions in the same direction, namely, in this example 40 microseconds, an additional pair of single-shot multivibrators 56 and 57 are employed to obtain an additional 40-microsecond delay that is desired in delay unit 40.

It will be noted that the reference input from subsystem 13 is delayed by unit 39 and coupled to digital multiplier 44 and 44a. This will provide a reference time or pulse as indicated in FIG. 3 by the pulse REF. The data output from receiver 15 is coupled directly to digital multiplier 44 to provide the data pulse 59 as illustrated in FIG. 3 and through delay unit 40 to provide the data signal 60, FIG. 3. The output of delay unit 40 is coupled to digital multiplier 44a. Thus, as illustrated in FIG. 3, digital multiplier 44a will multiply the reference signal REF with the data signal 60, while multiplier 44 will multiply the reference signal REF with the data pulse 59. Any voltage difference between these two multiplied results will be subtracted in amplifier 41 resulting in an error signal which is employed to control subsystems 9, 13 and 17 so as to tend this difference between these two autocorrelator outputs to zero. Namely, the time difference between signal REF and data pulse 59 and REF and data pulse 60 should be equal when the error signal is zero.

Low-pass filters 45 and 45a are simple RC filters. The response of these filters is critical in determining system performance. It is necessary that the filter time constant be large enough so that the autocorrelator output represents an average over a sufficiently large number of bits. If the number of bits over which the average is taken is too small, then the output will have excessive self-noise causing a degradation in the accuracy of the closed-loop control.

Conversely, it is necessary that the filter time constant be small enough so that filters 45 and 45a can respond to the effect of the correction pulses quickly enough to prevent over correction or hunting.

This system is designed to match up two data streams to within 1 microsecond of each other, hence, corrections made in 0.5-microsecond increments are adequate. Having established the increment size, the incrementing clock rate is made large enough so that the product of the clock rate and the increment size is sufficient to track the maximum rate of Doppler that is expected. The dead zone is made 2 microseconds wide so that corrections will always be made if the delay difference excess ±1 microsecond. The filter response time must be short enough to accommodate the maximum expected Doppler with a safety factor to take care of cases where a scan and lock process is employed. This latter process can, in effect, increase the Doppler as received by the system due to the delay-scanning action.

The maximum Doppler expected for a 5,000 nautical mile circular orbit satellite is approximately 15 microseconds per second. To account for the scan process, the figure is increased to 45 microseconds per second. This is done to ensure that under the worse conditions, the scan will be able to catch up with the signal. The correction rate required to follow the worse case Doppler plus scan is 90 pulses per second. Since each correction pulse causes the delay to change by 0.5 microseconds and, since the correction threshold is ±1 microseconds, four correction pulses will cause the delay to traverse the entire threshold zone. At 90 pulses per second, this action will take 44 milliseconds. During this period, the DC voltage is a voltage ramp.

To prevent hunting, the filter time constant should be on the order of 25 percent of 44 milliseconds, or approximately 10 milliseconds. This corresponds to a cutoff frequency of 16 hertz Hz. Since the spectrum of a 50 KB/S nonreturn-to-zero wave has negligible energy at 16 Hz. the time response requirements of the filter in no way affect the requirements as an integrator.

Differential amplifier 41 is an operational amplifier with heavy feedback which provides a requisite gain and DC stability for the present application.

Buffer incrementer 36 contains clock 61 which continuously generates a pulse train suitable to instruct buffer storage subsystems 9, 13 and 17 to add or delete delay. Schmitt trigger 62 has a negative threshold activated by inverting operational amplifier 64 and Schmitt trigger 63 has a positive threshold coupled directly to amplifier 41. The threshold levels are provided within the requirements set forth hereinabove in discussing filters 45. Schmitt triggers 62 and 63 are used to gate the pulse train from single-shot multivibrator 65 to the appropriate output lines to subsystems 9, 13 and 17 through ANDs 66 and 67. The polarity of the output of detector 35 (the output of differential amplifier 41) determines into which line the pulses from multivibrator 65 are gated by triggers 62 and 63. If the output from amplifier 41 is below the trigger thresholds of triggers 62 and 63 no correction pulses are sent. The rate of clock 61 is selected in conjunction with the time constant of low-pass filters 45. The output from amplifier 41 is varying DC developed in autocorrelators 37 and 38. Triggers 62 and 63 sense the occurrence of voltage above or below their appropriate thresholds. When this happens, one or the other of AND gate 66 and 67 is enabled and pulses from multivibrator 65 appear on the appropriate delay control line to subsystem 13. NOTs 42 and 43 provide the outputs to subsystems 9 and 17.

FIG. 6 illustrates the control characteristic error voltage Ve versus time, where $t_o$=18 microseconds ($\mu$sec.) for subsystem 14. It should be noted that the flat portion of the curve is the large signal clipping due to a pair of back-to-back zener diodes placed across the output of differential amplifier 41 to protect incrementer 36 from excessive input voltage. As mentioned hereinabove, initial compensation time delay tag generator 51 (FIG. 8) produces initial delays in delay counter 26 (FIG. 8) so as to be in the control range of control subsystem 14.

Sync clock generators 20 and 21 lock in with the received data bit stream from source 6 and receiver 16, respectively. These devices are necessary because the data bit streams are not normally accompanied by their clock and it is necessary to extract the clock from the bit stream itself. Referring to FIG. 7, there is illustrated therein in block diagram form the components contained in sync clock generator 20. The local clock 68 is set to a rate equal to eight times the nominal bit rate of 50 KB/S. This high rate is counted down by a factor of 8 by the three flip-flop binary counter divider 69 to produce the correct nominal rate of 50 kHz. shown extracted from line A of divider 69. Zero-crossing detector 70 is coupled to source 6 (FIG. 1) and produces pulses at each zero crossing in the data. These zero-crossing pulses are gated by ANDs 71 and 72 into the retard and add count lines by the A and $\bar{A}$ outputs of divider 69. The effect of the outputs from ANDs 71 and 72 is to shift the phase of divider 69 output forward and backward by one-eighth of a bit width. The result is that the derived clock output is brought to the correct frequency and phase relationship with the data and is held to ±1/8 bit with the correct relationship. When there are no zero-crossing pulses present, the output from divider 69 will maintain its phase relationship to within the stability of clock 68. For this reason, it is necessary to have a local clock of high-stability set very closely to the correct average rate. If all possible zero crossings are present, this unit will be capable of following a Doppler rate of one-eighth bit per bit or 125 milliseconds/second. In the practical case, this following ability is reduced in direct proportion to the ratio of the zero crossings present to the maximum possible number of zero crossings, and also by a factor depending on the local clock stability, Doppler rate and the maximum number of expected consecutive bits without a zero crossing.

The unit just described, identified as synchronous data clock 73, is sync clock generator 21.

Since synchronous clock generator 20 must also provide the 2 MHz. synchronous clock, the A output of divider 69 is coupled through low-pass filter 74 to the phase detector 75. The other input of phase detector 75 is provided from a voltage-controlled oscillator 76 having a nominal frequency of 2 MHz. whose output is coupled to pulse shaper 77 and provides the synchronous clock at a frequency of 2 MHz. The frequency control of oscillator 76 is provided by dividing by a factor of 40 in binary counter divider 78 to provide a 50 kHz. clock which is passed through low-pass filter 79 to the other input of phase detector 75 which compares the two 50 kHz. clocks applied thereto to produce a voltage control signal for coupling to oscillator 76 to lock this oscillator to the proper phase relationship with the 50 kHz. clock and, thereby, generate the necessary 2 MHz. synchronous clock.

Referring to FIG. 8, there is illustrated therein in block diagram form the buffer storage subsystem that may be employed in subsystems 9, 13 and 17. These buffer storage subsystems use magnetic core memory 22 capable of storing 2,000 bits with associated read-in, readout and address logic. These subsystems are designed to allow independent read-in and readout rates normally at 50 KB/S. Different rates can be accommodated by minor changes in the associated clock circuits. The initial readout address can be preset to provide an initial delay if required. The readout rate can then be maintained constant, or controlled on a closed-loop basis to establish synchronization with a data stream or timing reference. The buffer storage subsystems will assemble and store incoming data for a specified period and retrieve the data after a requisite amount of the delay has expired.

The storage subsystems are set to a zero state by the 1 INZ output of static control source 80. Then the initial delay information from generator 51 is placed in delay counter 26. The binary delay information, consisting of 15 bits from generator 51, will represent the amount of initial delay that is to be applied to the input data stream and will be in the range between 2 microseconds and 40 milliseconds. The exact amount of initial delay to be provided will depend upon the orbiting information of the satellite and is employed so that control subsystem 14 will be in its pull-in range. The particular initial delay inserted into counter 26 is determined by the binary condition of the 15 bits from source generator 51 and can be selected manually by an operator who knows the predicted orbital information of the satellite, or can be provided automatically by a computer which is programmed to follow the range and orbiting information of the satellite, in active use, or about to be made active in the handover process.

The input to the storage subsystems from either source 6, or receiver 16, will be a binary data bit stream with a normal rate of 50 KB/S (1LDV) and a 50 kHz. synchronous clock (1LFV) from generator 20. The signal 1LDV is applied to line data value circuit 81. As the first input data bit is detected by the rising edge of the synchronous clock, delay counter 26 will be decreased by one bit every 2 microseconds. While delay counter 26 is approaching zero, the write data buffer 23 assembles the incoming information into words before it is inserted into memory 22 for storage. The write address register 27, initially reset to zero by OINZ from circuit 96, specifies where the data is to be placed in the memory by the memory address signals 1MAD1 to 1MAD128. These signals are derived from cooperating NAND circuits which performs a logical OR function. Thus, the signal 1MAD1 to -1MAD128 represent either the write address signal or read address signal. As each succeeding word is placed in memory 22, the write address register 27 is advanced by one. The incoming data from circuit 81 is, therefore, placed in consecutive order in memory 22 starting at word position zero.

When delay counter 26 approaches zero, the initial delay has nearly expired and a retrieval of the original input data begins. The data in word position zero, as specified by the initially reset read address register 28, is unloaded from storage and placed in read data buffer 24. Ten microseconds before the initial delay has expired in counter 26, the first output data bit is shifted from the read data buffer 24 to data send flip-flop 83 and, hence, to the output line whose signal is represented by 1SLDV. This signal is applied to transmitter 10 in the case of subsystem 9, subsystem 14 in the case of subsystem 13 and device 19 in the case of subsystem 17. This action will ensure that the center of the first output data bit occurs as the delay counter 26 reaches zero. The remainder of the output data word, held in buffer 24, is then disassembled into a serial bit stream and placed on the output line at a 50 KB/S rate. Register 28 then specifies the next output data word in the memory through the memory address signals 1MAD1 to 1MAD128. As each successive data word is read from memory 22, register 28 is advanced by one.

Delay control circuits 25 regulate the flow of data by ensuring the proper interaction of all parts of the buffer storage subsystems. It contains the timing source for these subsystems, controls the assembly and disassembly of data, regulates access to memory 22 and monitors the delay network.

Decoder 84 is coupled to delay counter 26 to provide information for control circuit 25 as to the count of counter 26, particularly, as it approaches zero.

A few comments will now be made about certain of the critical components in the storage subsystems of FIG. 8.

The minimum size of core memory 22 is determined by the maximum amount of data to be stored. For a data input rate of 50 KB/S and a maximum delay of 40 milliseconds, a storage capacity of 2,000 bits is required. For this application, a capacity of 256 words with eight bits per word is the smallest satisfactory memory available. This will store 2,048 bits to provide a maximum system delay of 40.96 milliseconds.

The maximum cycle time of core memory 22 is determined by the number of memory cycles that must be performed for a unit time interval. Since core memory 22 contains eight bits per word, after eight data bits have been assembled into write buffer 23, access to memory 22 must be gained to store the assembled data before a new data bit can be accepted. Because a memory unload cycle may also be necessary at the same time to provide a data word into read buffer 24 for disassembly, two memory cycles may occur during a single bit period. For a 50 KB/S input data stream, the maximum memory cycle time must be limited to 10 microseconds.

The maximum subsystem delay that can be applied to the input data stream is determined by the storage capacity. For the 2048-bit memory, the delay is limited to 40.96 milliseconds. To determine the minimum delay other factors must be considered. An analysis of the system of FIG. 8 has shown that before the first output data bit can be placed on the output line, three operations must be performed: (1) eight input data bits must be assembled in write buffer 23; (2) the data must be loaded into core memory 22; and (3) the data must be unloaded from memory 22 into read buffer 24. For a 50 KB/S data input line, with bit periods of 20 microseconds and a memory cycle time of 8 microseconds, a minimum delay of 176 microseconds is the best that may be expected. With the addition of the minimum delay factor, the effective system delay range is 176 microseconds to 40.9 milliseconds.

The buffer storage subsystems will also contain means to adjust the system delay. As shown in FIG. 8, two control lines from system 14 are applied to control circuits 25 to provide this delay adjustment. With the system basic clock frequency of 2 MHz.; enabling the add delayed adjustment control line (1ADA) will increase the total system delay by 0.5 microseconds and, conversely, enabling the decrease delay adjustment control line (1DDA) will decrease the system delay by 0.5 microseconds. The technique that will be employed to increase, or decrease the effective system delay will be to lengthen or shorten an individual data bit by 0.5-microsecond increments in data send flip-flop 83. In this manner, it will be possible to maintain a bit resolution of ±0.5 microseconds. Except for the small change in the data rate due to the incremental delay change, the output data rate from flip-flop 83 will be constant.

To ensure reliable operation of the core memory delay system, parity checks on the data flow are made through the storage subsystems. A system malfunction may be discovered and isolated as soon as possible. As each incoming data bit is assembled in write buffer 23 an odd parity bit for the buffer will be generated. For each logic "1" data bit assembled, the write data buffer parity flip-flop located in circuit 81, initially set to the "1" state, will be complemented. As a result, when eight input data bits have been assembled in write buffer 23, the parity flip-flop will contain the correct odd parity bit. The parity bit will then be stored with its corresponding data in the next memory 22. After each data word is read in sequence from memory 22, it is checked for correct parity as it is disassembled and placed on the output line. If a data parity error is discovered, the system error signal will be enabled. Provisions are made in source 80 to reset or clear the parity error indication and is identified as 1PARR.

Figure 9:
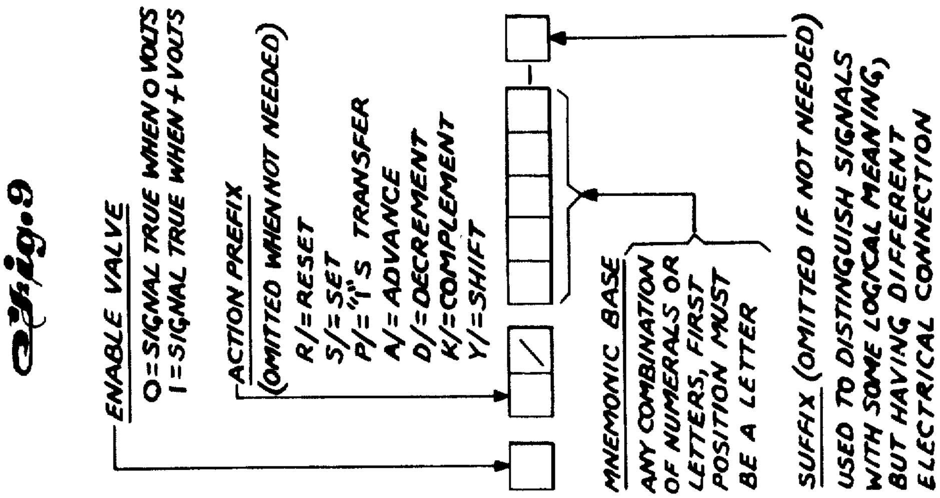
FIG. 9 illustrates the mnemonic code employed herein to identify and indicate the function of logic signals of FIGS. 8, 10, 13A–13J, and 14B–14F.

As illustrated in FIG. 8 and mentioned hereinabove certain symbols are used to identify the signals and their functions and are known as a mnemonic code. The mnemonic code is useful in identifying the signal and giving an indication simultaneously of its function. FIG. 9 illustrates the mnemonic code and reference thereto is self-explanatory and will be used as illustrated in FIG. 8 throughout the logic diagram of the storage subsystem logic circuitry of FIGS. 13A–13J and the logic flow diagrams of FIGS. 14B–14F to identify the signals and give an indication of their functions.

As mentioned hereinabove, FIG. 9 shows the mnemonic code and the table hereinbelow identifies the mnemonic base and the function thereof.

Figures 7, 10:
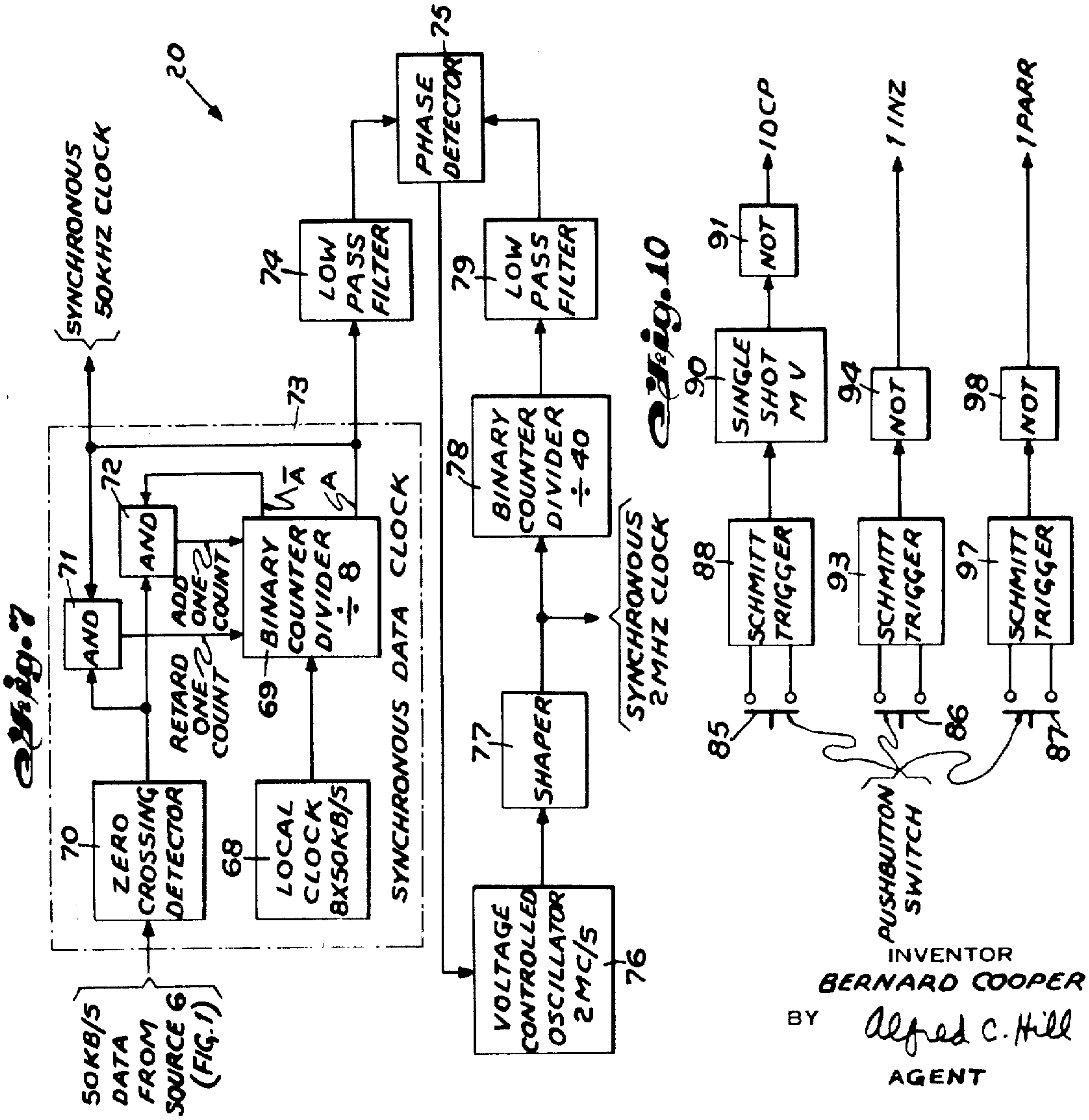
FIG. 7 is a block diagram of the sync clock generator of FIG. 1.
FIG. 10 is a block diagram of the static control source of FIG. 8.

Referring to FIG. 10, there is illustrated therein the components making up the static control source 80 of FIG. 8. Source 80 produces the static controls 1DCP, 1INZ, and 1PARR. Each of these signals are generated by activating the appropriate one of the pushbuttons 85, 86 and 87. When pushbutton 85 is activated Schmitt trigger 88 is set into operation to produce an output which is coupled to a single-shot multivibrator 90 which produces a negative output of given width. The output of single-shot multivibrator 90 is coupled through NOT 91 to provide the signal 1DCP which is coupled to counter 26 of FIG. 8 to enable the initial compensation time delay count to be set into counter 26. Signal 1INZ is produced by activating pushbutton 86 which, in turn, activates Schmitt trigger 93 which produces a negative output which is inverted by NOT 94. This signal is coupled to system initialize circuit 96 of FIG. 8 whose output is used to assure that the various components of the storage subsystems are reset to zero. The parity error reset signal 1PARR is produced by activating pushbutton 87 which activates Schmitt trigger 97 which again is a negative output which is inverted by NOT 98. The signal 1PARR is coupled to circuits 25.

Figures 11, 12, 14A:
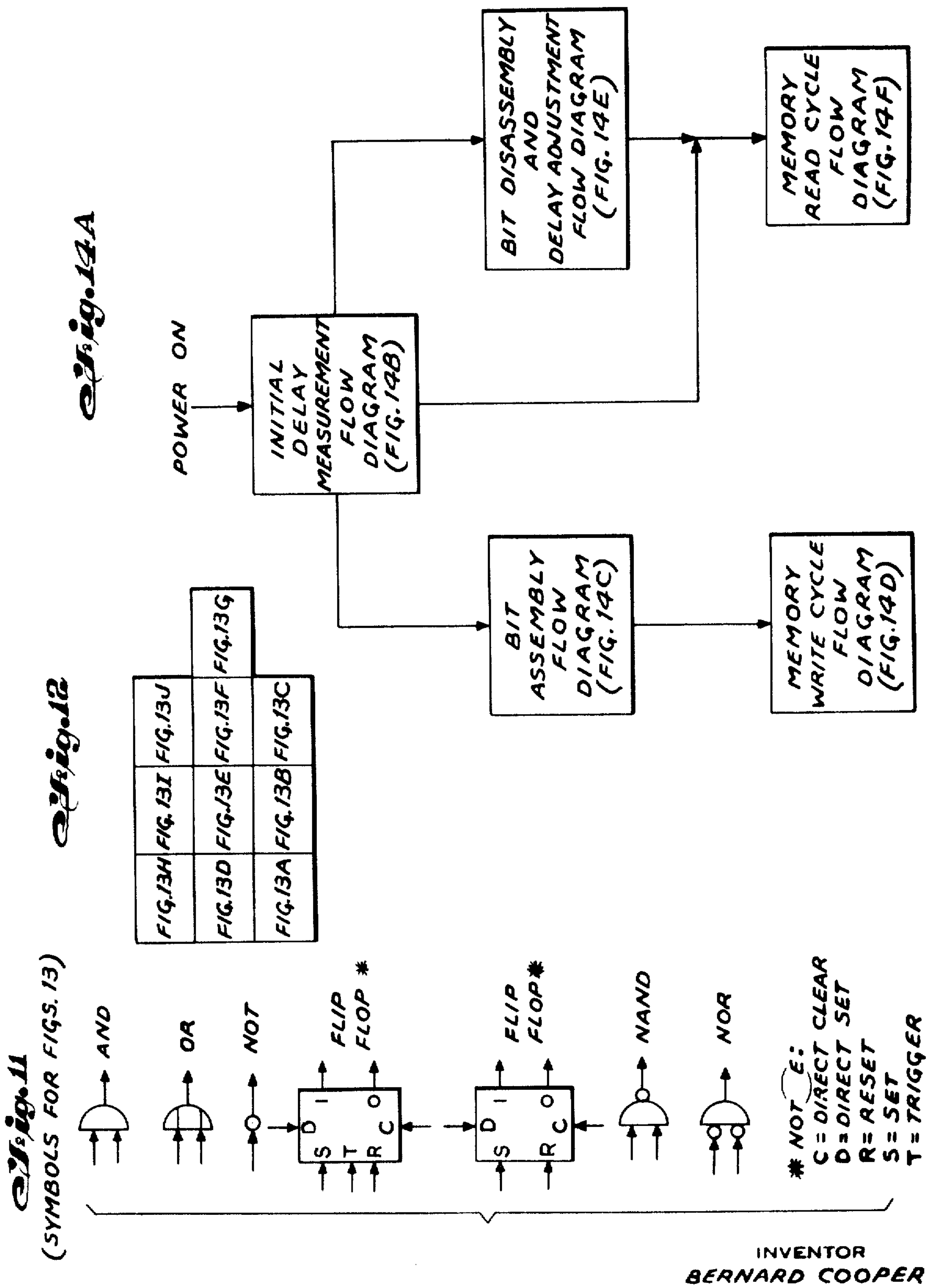
FIG. 11 illustrates the symbols employed in the logic diagram of FIGS. 13.
FIG. 12 is a block diagram illustrating the layout of FIGS. 13 to provide the logic circuit of the buffer storage subsystem of FIG. 8.
FIGS. 14A to 14F illustrate the logic flow diagram describing the operation of the logic circuit of FIGS. 13A to 13J.

FIG. 11 illustrates the symbols of the logic components employed in the logic circuits of FIGS. 13A–13J when the sheets of drawings containing these Figures are laid out according to FIG. 12.

FIGS. 13A–13J, when the sheets are laid out according to the illustration of FIG. 12, show the various logic components employed in the various circuits of the storage subsystems illustrated in FIG. 8 with the exception of magnetic core memory 22 and static control source 80 which has been illustrated separately in FIG. 10. The operation of FIGS. 13A–13J are readily apparent to one skilled in the art and are described in the flow logic diagram illustrated in FIGS. 14A–14F. Employing the logic diagrams of FIGS. 13A–13J and the logic flow diagram of FIGS. 14A–14F, it would be readily possible for one ordinarily skilled in the art to construct the buffer storage subsystems necessary in the operation of the system of FIG. 1.

The logic circuits for delay control circuits 25 are illustrated in FIGS. 13D, 13E, 13F, and 13G as including line sync value circuit 108, memory address gate 100, write control circuit 101, read-write control circuit 102, read control circuit 103, time counter 104, time counter decoder 105, delay adjustment flip-flops 107, and synchronous counter 107. Particular attention should be directed to memory address gate 100 (FIG. 13D) which effectively, through the use of the NAND circuits illustrated, performs an OR function on write signals 1WAC1–1WAC28 and the read control signals 1RAC1–1RAC28. Thus, the memory address signals 1MAD1–1MAD28 include the read or write address signals RAC or WAC depending upon the time of gating of the NANDS by the write control signal 1WCE and the read control signal 1RCE.

The operation of the logic circuits of the storage subsystem as illustrated in FIGS. 13A–13J is described by the logic flow diagrams illustrated in FIGS. 14A–14F and the following brief description. FIG. 14A shows in block form the logical function that will be performed by the system of FIGS. 13A–13J and how they are interrelated to one another. FIGS. 14B to 14F describe, in detail, the logical functions that are shown in FIG. 14A.

Figure 13A:
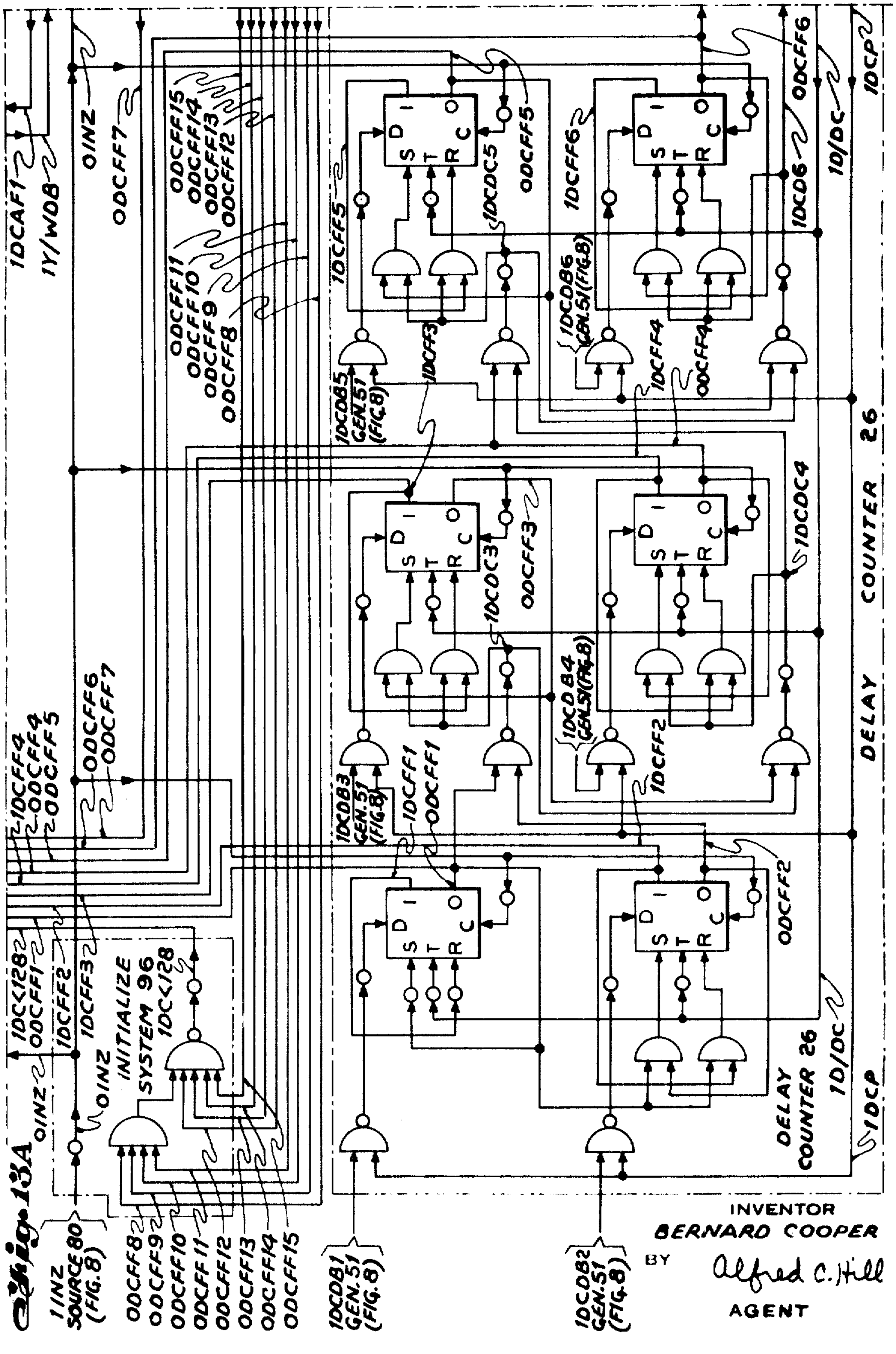
FIGS. 13 to 13J, when laid out according to FIG. 12, illustrate the logic circuit for the buffer storage subsystem of FIG. 8.
Figure 13B:
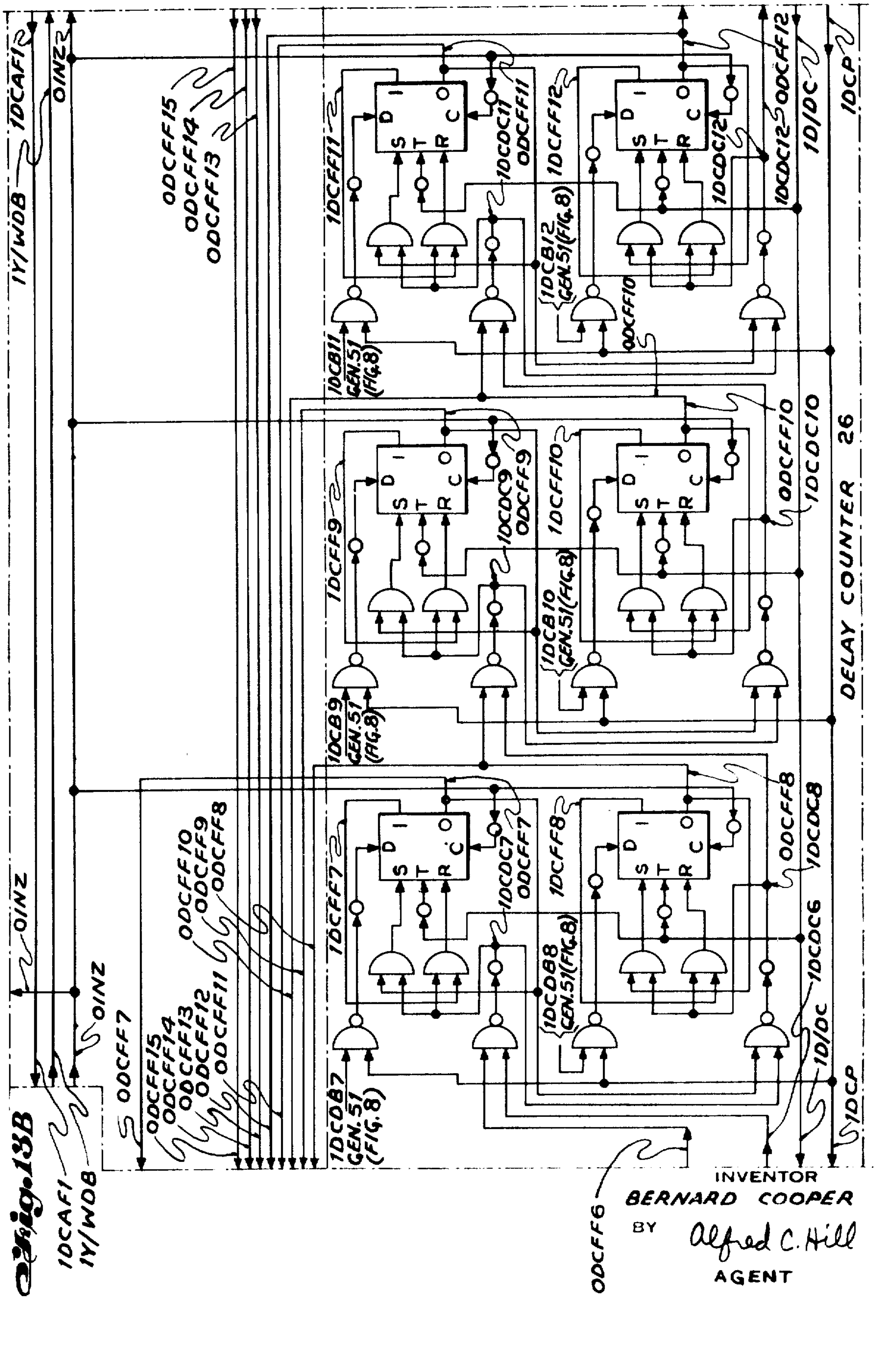
Figure 13C:
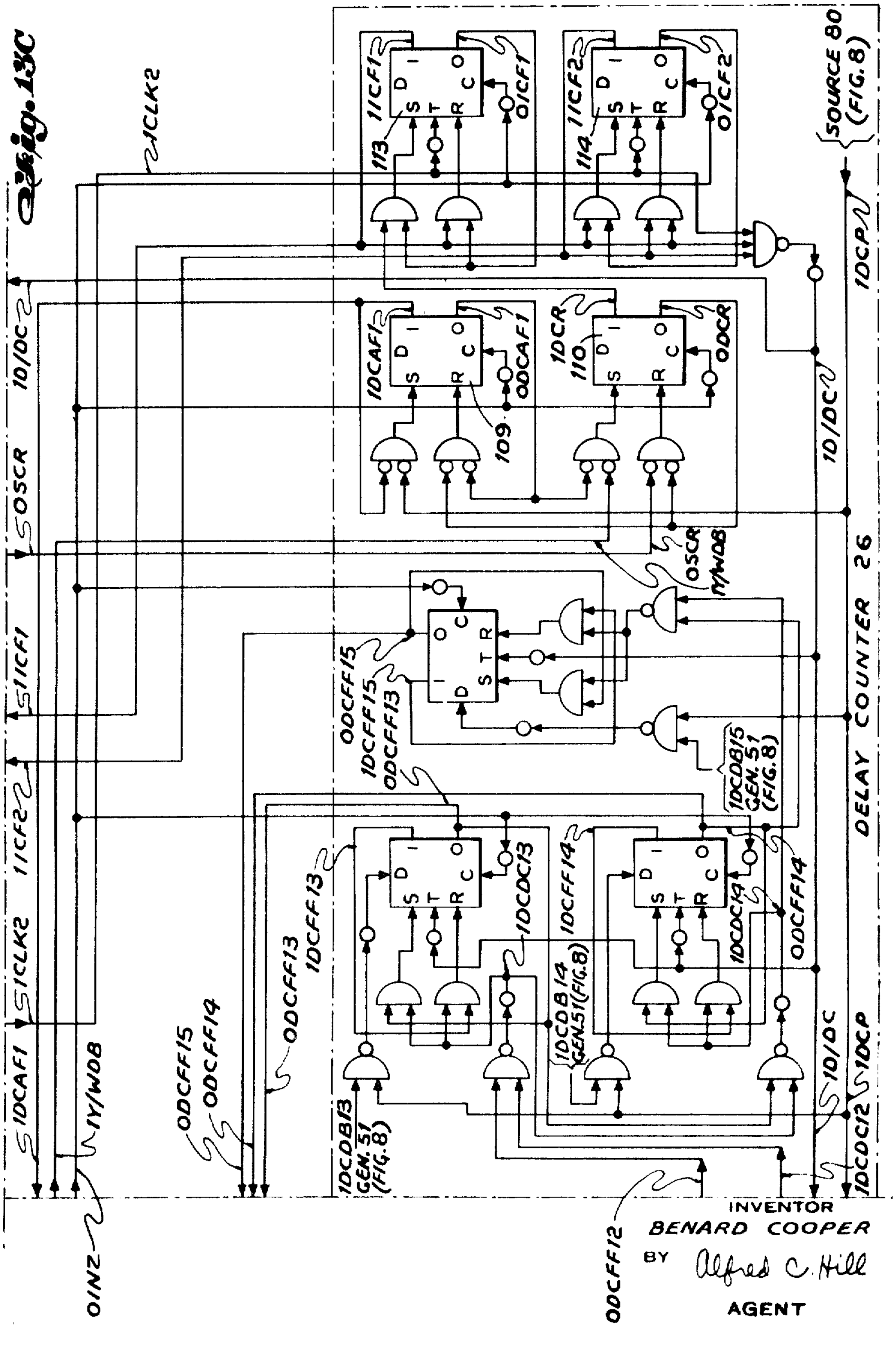
Figure 13D:
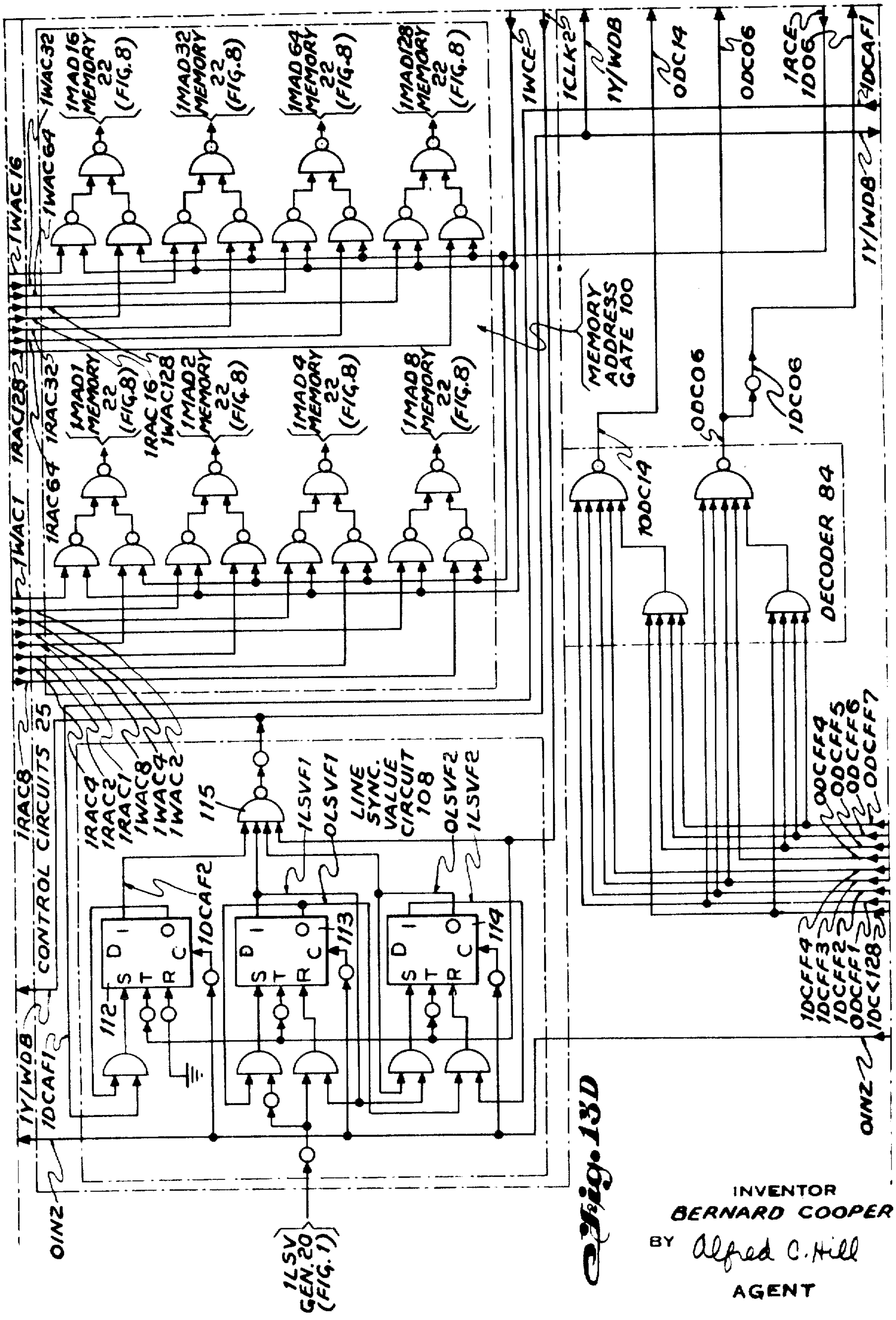
Figure 14B:
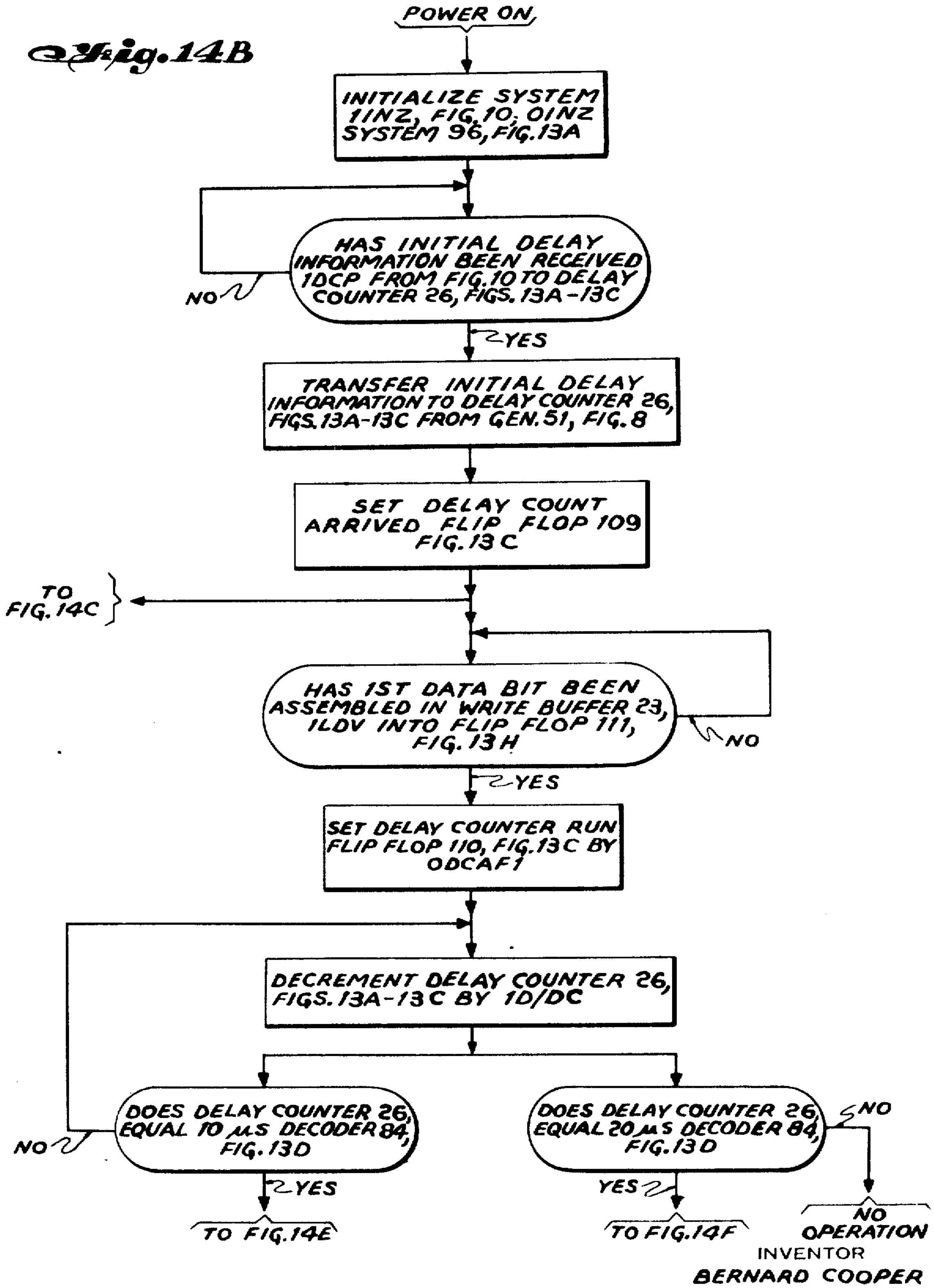

FIG. 14B describes the systems initial delay measurement. As shown, after power has been applied the system is reset to zero by OINZ and remains in the reset state until the initial delay information is received from generator 51. The detection of a delay count present pulse 1DCP from source 80 (FIG. 10) initiates the acceptance of the delay information. With the receipt of the delay count present pulse 1DCP, the delay information, from generator 51 is transferred to delay counter 26, FIGS. 13A–13C and the trailing edge of the pulse is used to set the delay count arrived flip-flop 109, FIG. 13C.

After receiving the initial delay information, the bit assembly logic is enabled and the system awaits the arrival of the first data bit from source 6 or receiver 16. When the first data bit is detected and assembled, the delay counter run flip-flop 110, FIG. 13C is set and delay counter 26 is decremented by one every 2 microseconds until the specified delay has expired. As shown in the flow diagram two decoded values of delay counter 26 are detected by decoder 84, FIG. 13D, while counter 26 is being decremented. The first, 20 microseconds before delay expiration, is used to request the first memory unload cycle in preparation for bit disassembly. The second decoded value of detector 84, 10 microseconds before delay expiration, is used to place the first data bit on the output line. The first data bit is placed on the output line 10 microseconds before the preset delay of counter 26 has expired so that the center of the output pulse will coincide with counter 26 returning to zero as the preset delay expires.

Figure 13E:
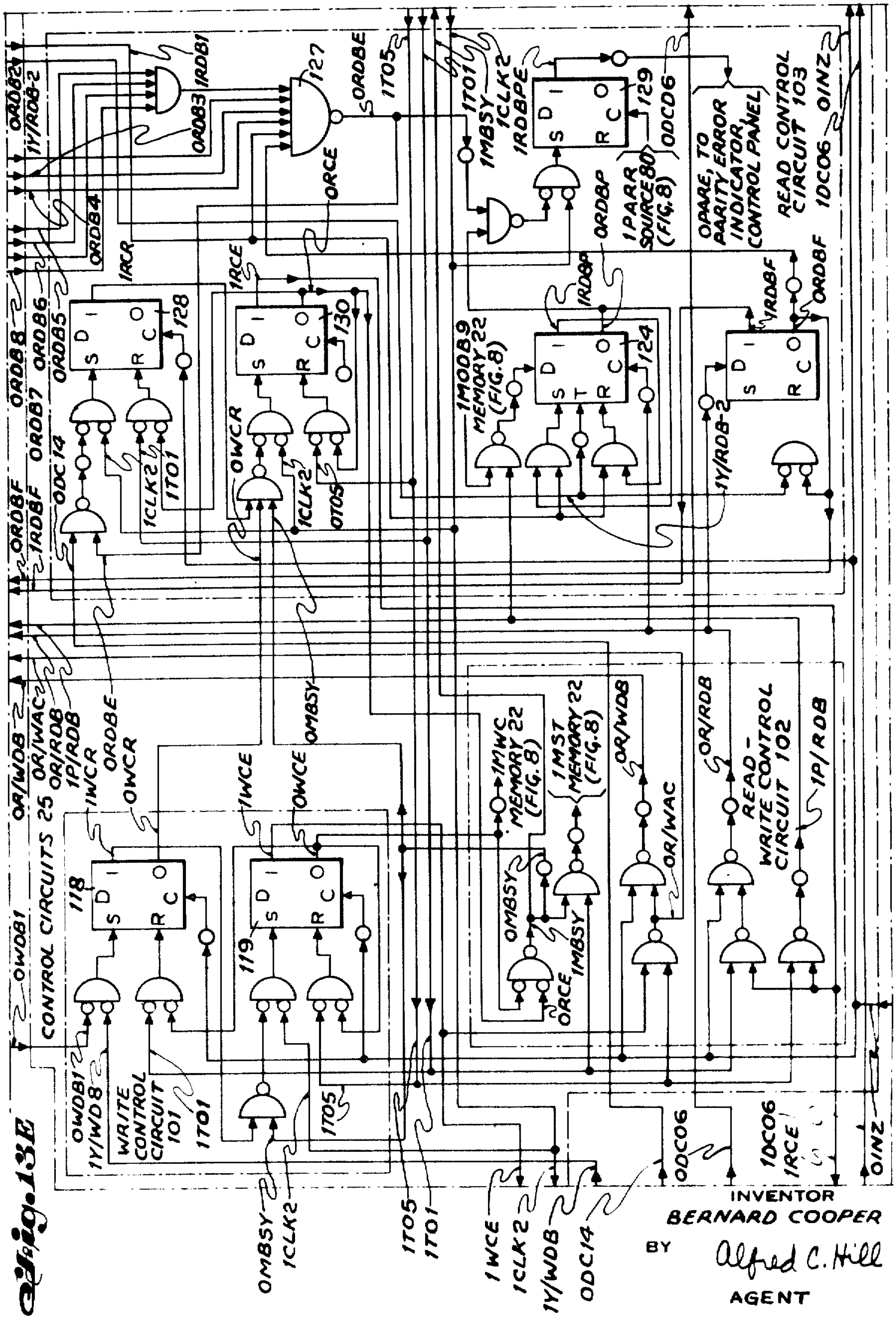
Figure 13F:
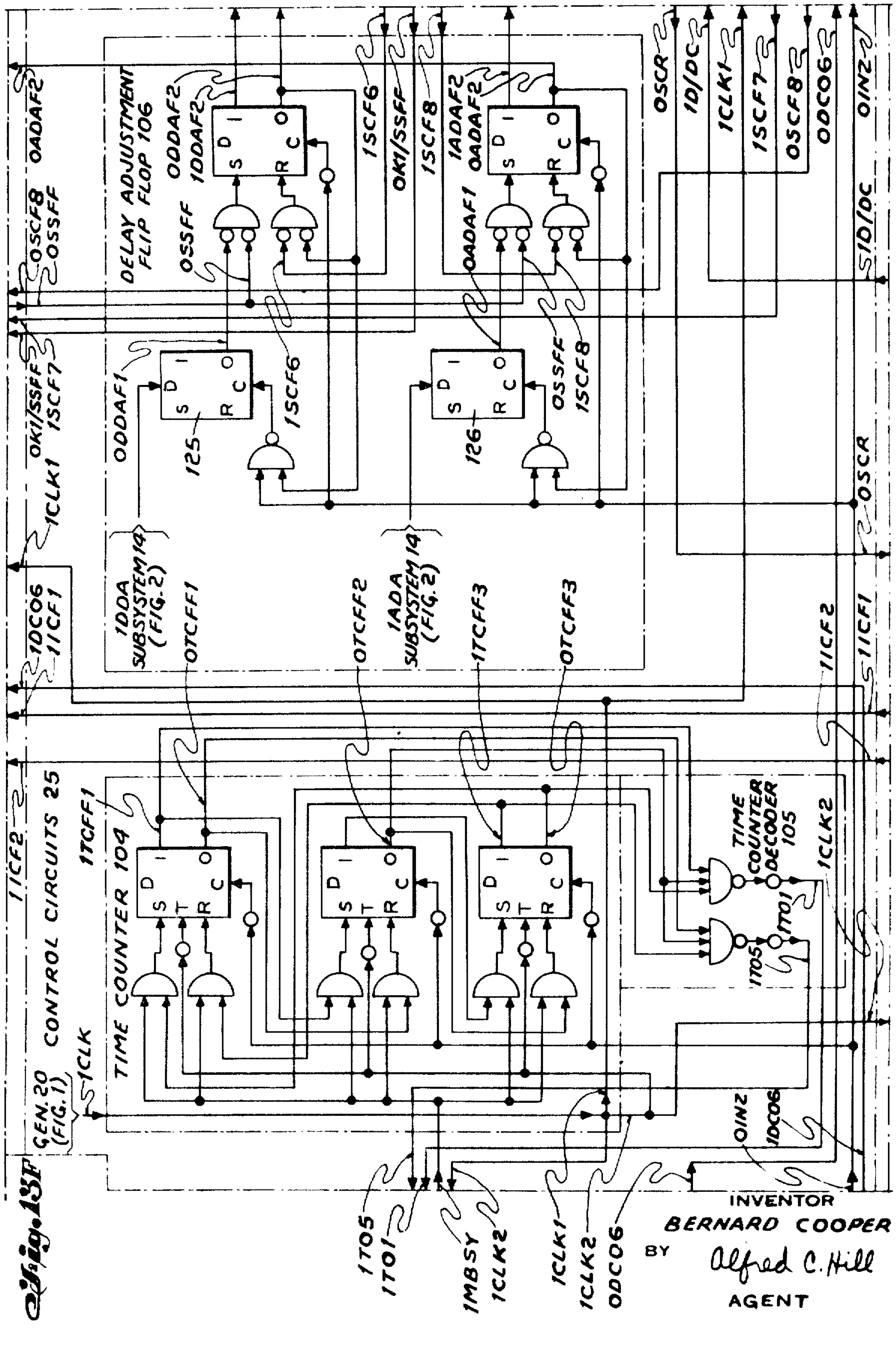
Figure 13G:
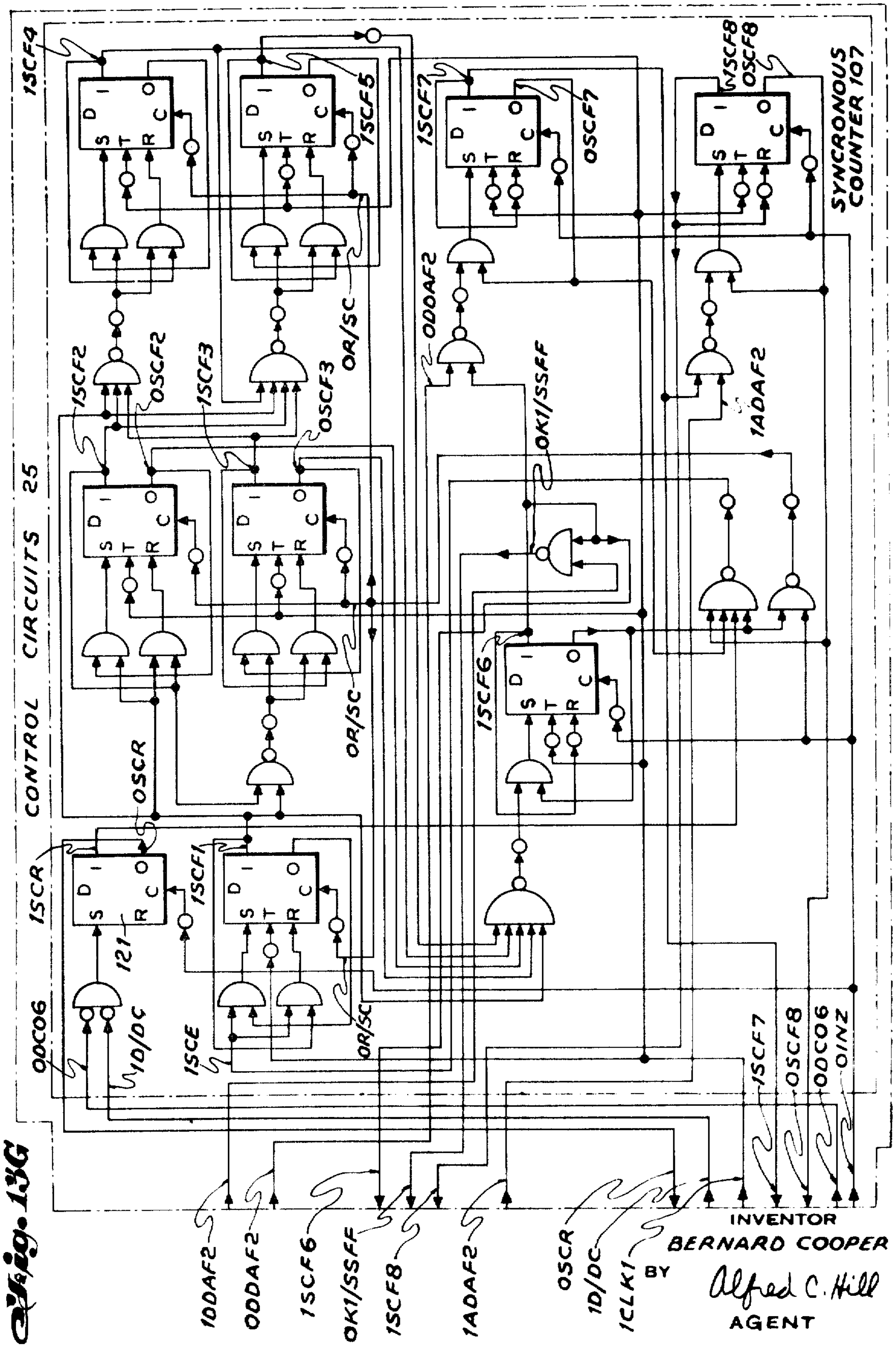
Figure 13H:
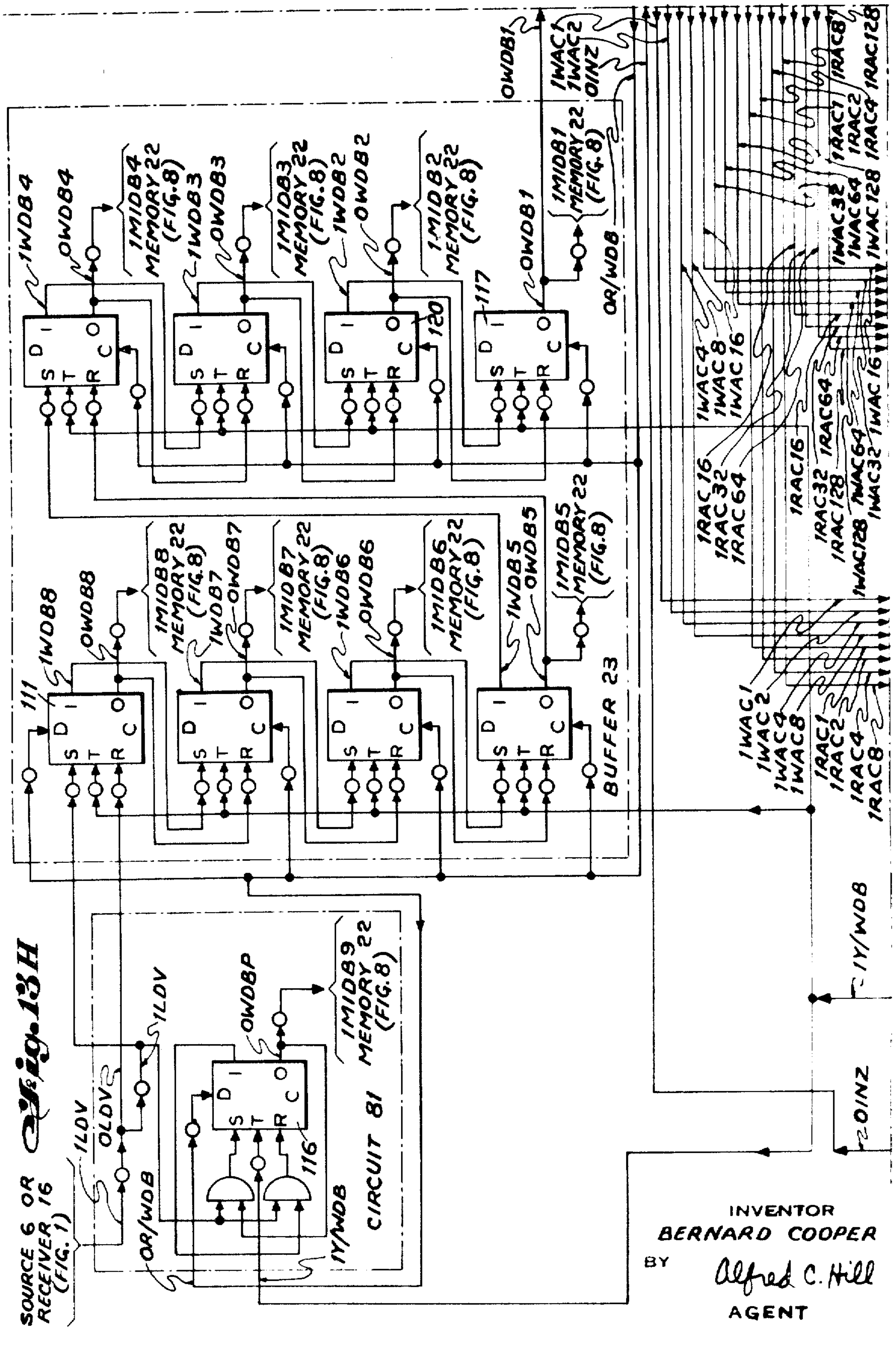

With the assembly of the first data bit in writer buffer 23, FIG. 13H delay counter run flip-flop 110, FIG. 13C is set and interval counter flip-flop 113 and 114 is enabled. The interval counter, a two-stage binary counter, divides the 2 MHz. basic system clock frequency down to 50 kHz. and governs the decrementing of counter 26 at 2 -microsecond intervals by 1D/DC.

Figure 14C:
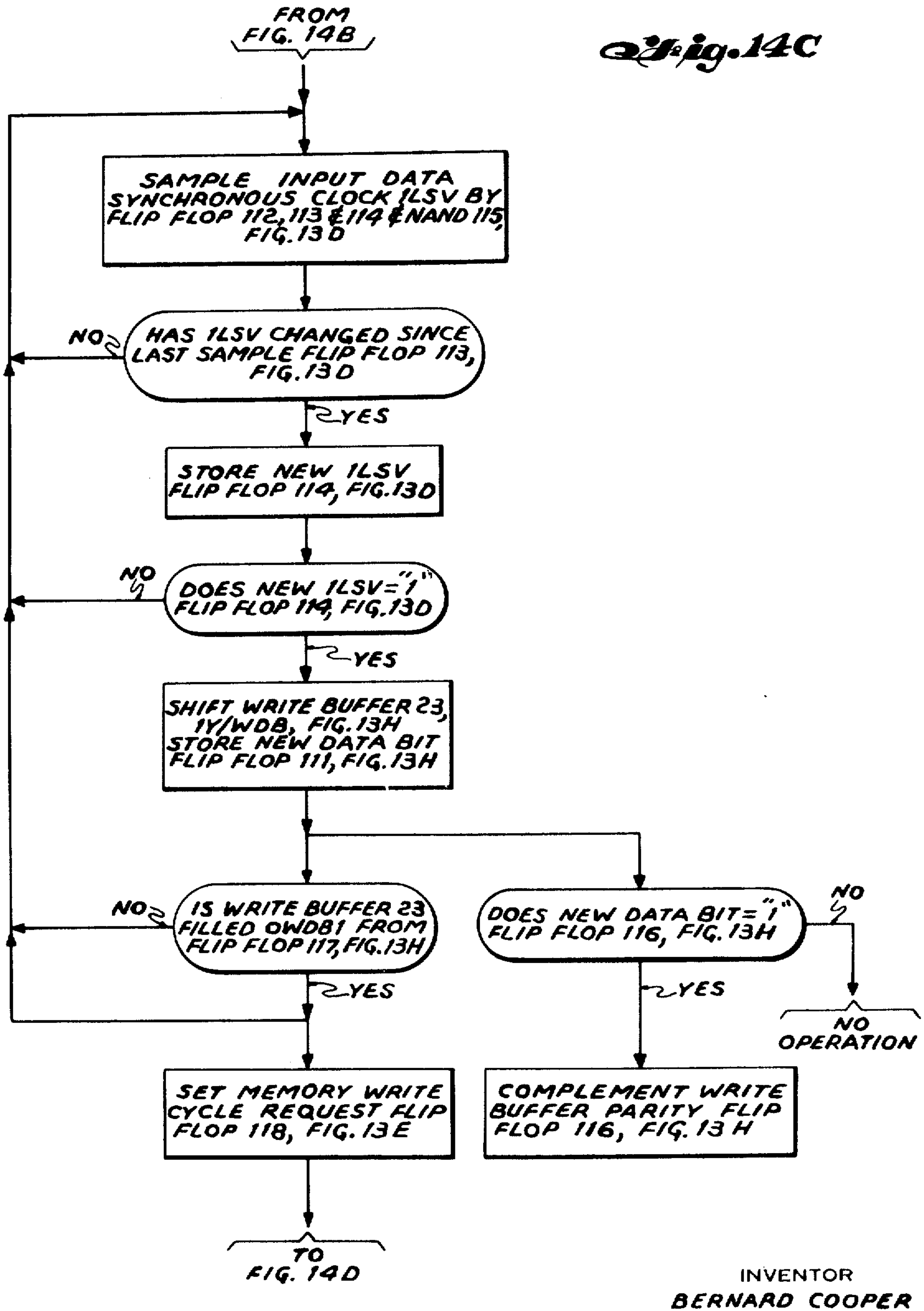

FIG. 14C describes the subsystem bit assembly process. As previously described, once the subsystem has received its initial delay information the bit assembly logic will be enabled and assembly of data is initiated. The input data synchronous clock is continuously sampled by the systems 2 MHz. basic clock frequency. When a change in a value of the input data clock is detected the new value is stored in a storage flip-flop 114, FIG. 13D. If the new value of the data clock is a logical "1" the data on the subsystems input data line is sampled by circuit 81 and is shifted into write buffer 23. The assembly of additional data bits will continue in an identical manner until eight data bits have been assembled and the write data buffer 23 is filled. Coincident with the shifting of each detected data bit into buffer 23 the write data buffer parity flip-flop 116, FIG. 13H is complemented for each logical "1" data bit assembled. Since the parity flip-flop is initially set to the "1"

state, it will contain the correct parity value for the write buffer 23 after eight data bits have been assembled.

Initially, write buffer 23 is reset to the all "0" condition except for bit position 07 which contains the flag bit used to detect the data write buffer filled condition. As each input data bit is detected and shifted into write buffer 23, position 07, the flag bit, is also shifted. Upon the assembly of the eight data bits, the flag bit energizes from write buffer 23 bit position 00 and the write cycle request flip-flop 118, FIG. 13E is set. A memory write cycle will be performed as soon as the memory is free. The systems timing is so arranged that a memory write cycle will occur before a new input data bit is detected.

Figure 13I:
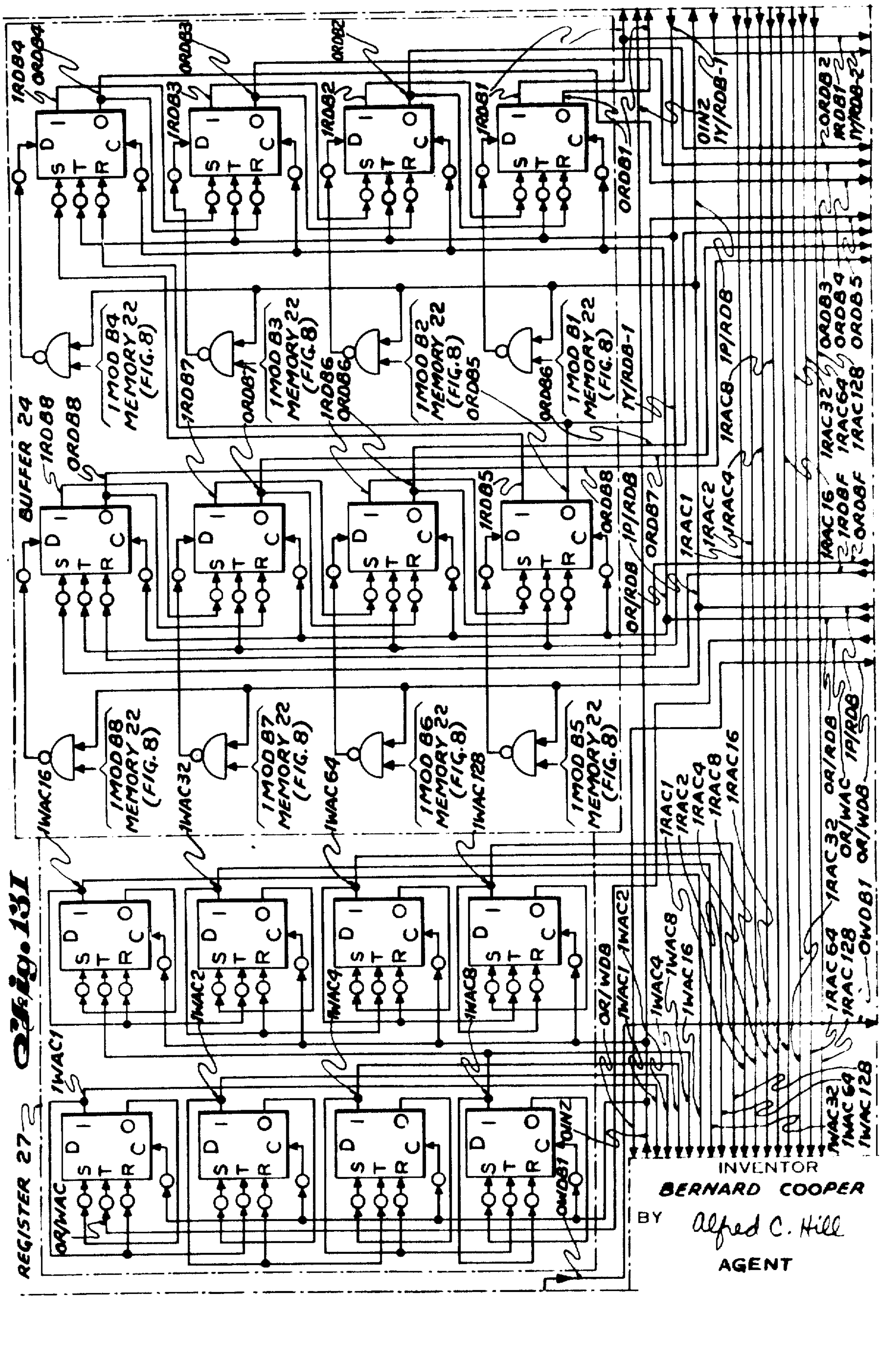
Figure 14D:
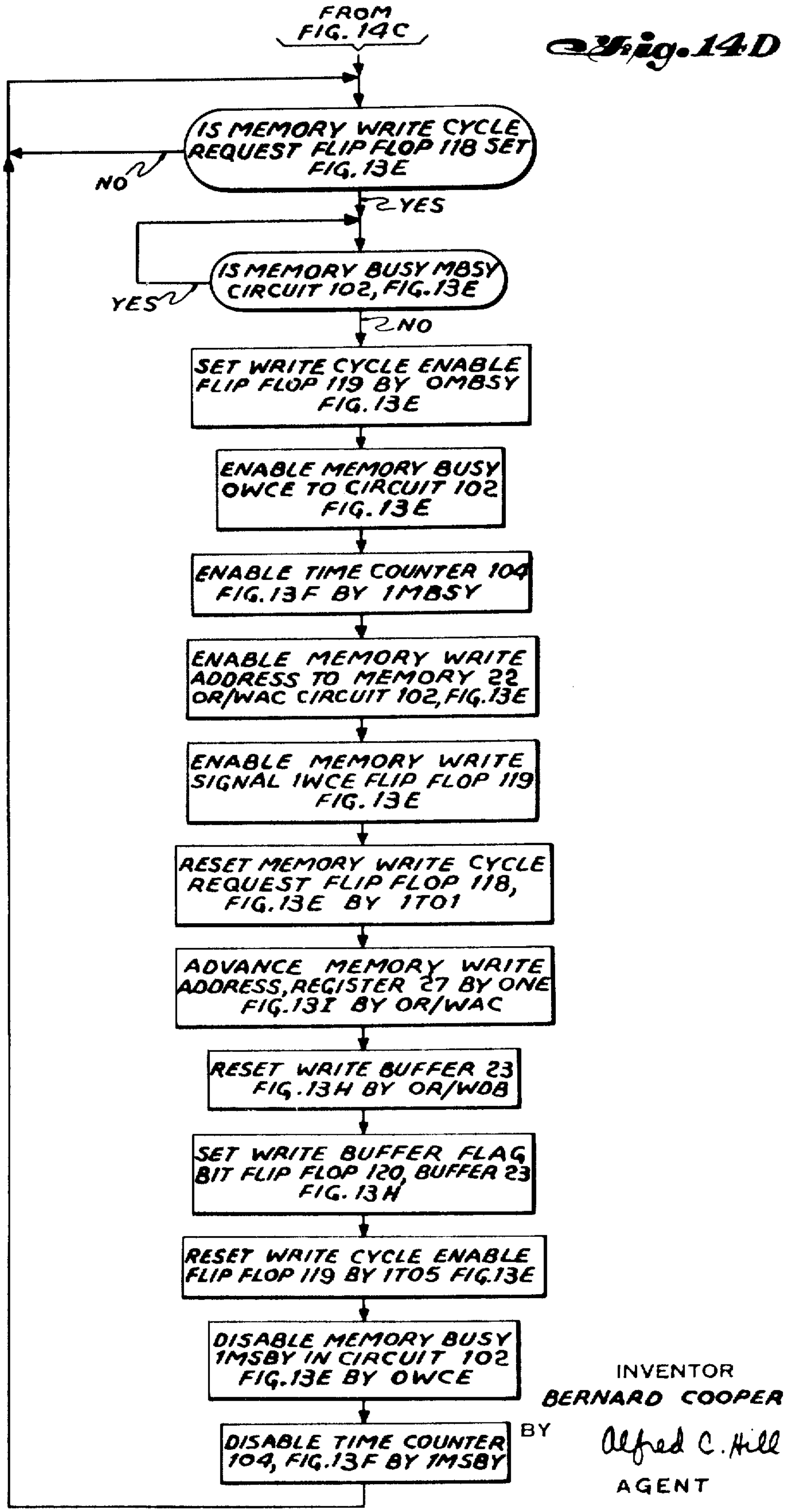

FIG. 14D describes the memory write cycle. As already shown in FIG. 14C, when a complete data word has been assembled in the write buffer 23, a memory cycle is requested by setting the write cycle requested flip-flop 118. If the memory control logic is not busy performing a read cycle, the request for a write operation will be honored immediately. If, however, the memory control is engaged in a read cycle, the start of the write cycle must wait until the memory is again free. In either case, when the memory is not "busy," the write cycle flip-flop 119, FIG. 13E is set and the write cycle initiated. With the start of the memory write cycle, the memory busy signal is enabled. Time counter 104, FIG. 13F is then started to provide time pulses for the memory cycle operation and the memory address contained in the write address register 27, FIG. 13I is gated to memory 22 by memory address gate 100, FIG. 13D. In the memory write cycle during time count 01, the memory write signal IWCE is enabled and the write cycle request flip-flop 118 is reset. During time count 05 write buffer 23 is reset and bit position 07 of buffer 23, the flag bit, is set to a logical "1" in preparation for the assembly of the next data word. The flag bit is used to indicate when the write buffer 23 is filled. On the trailing edge of time count 05 the write register 27 is advanced by one which is the address of the next load cycle and the write cycle flip-flop 119 is reset. With the reset of the write cycle flip-flop, the memory busy signal is disabled, time counter 104 is disabled, and the memory control is again free to perform any cycle that may be requested.

Figure 13J:
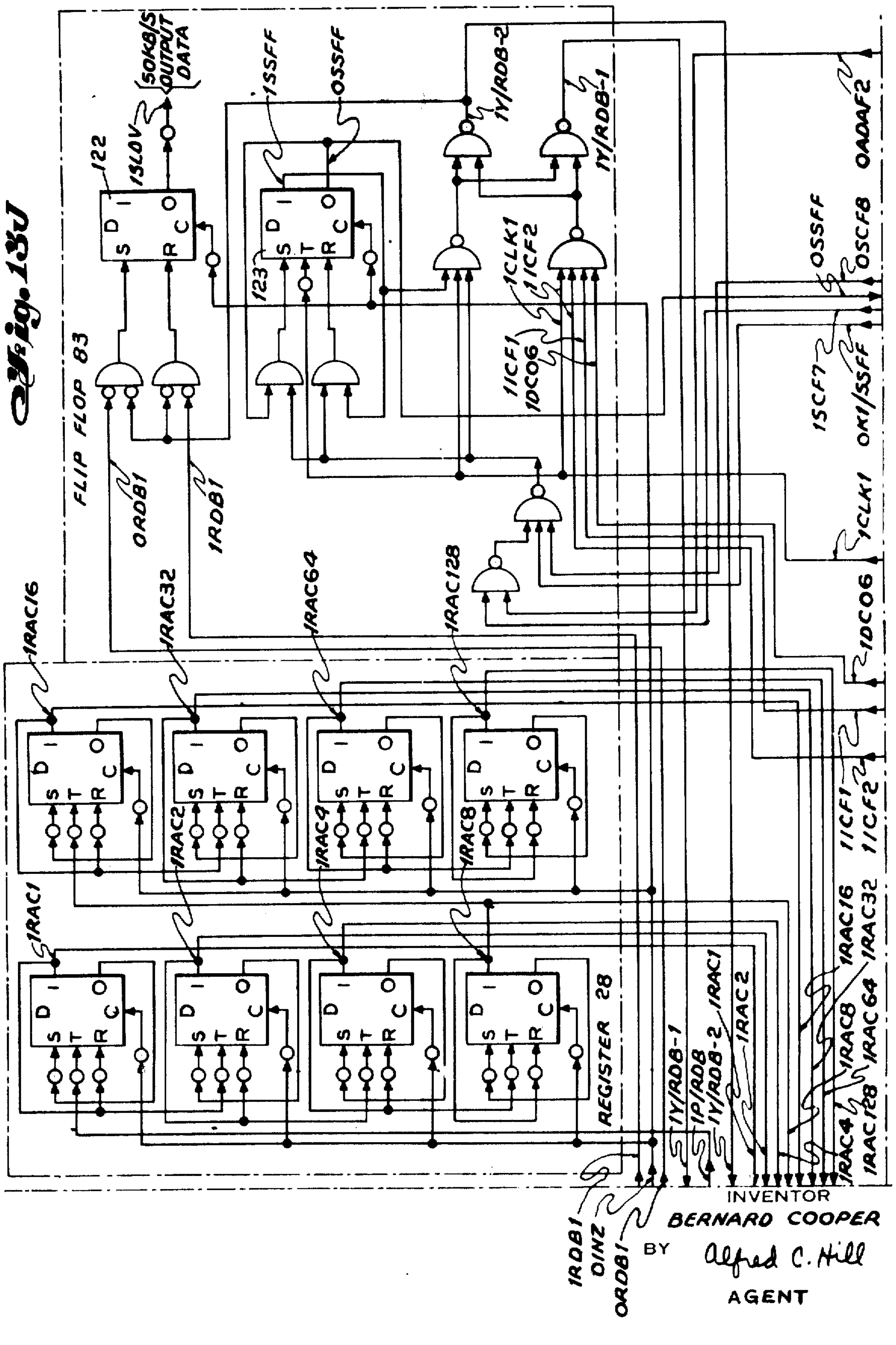
Figure 14E:
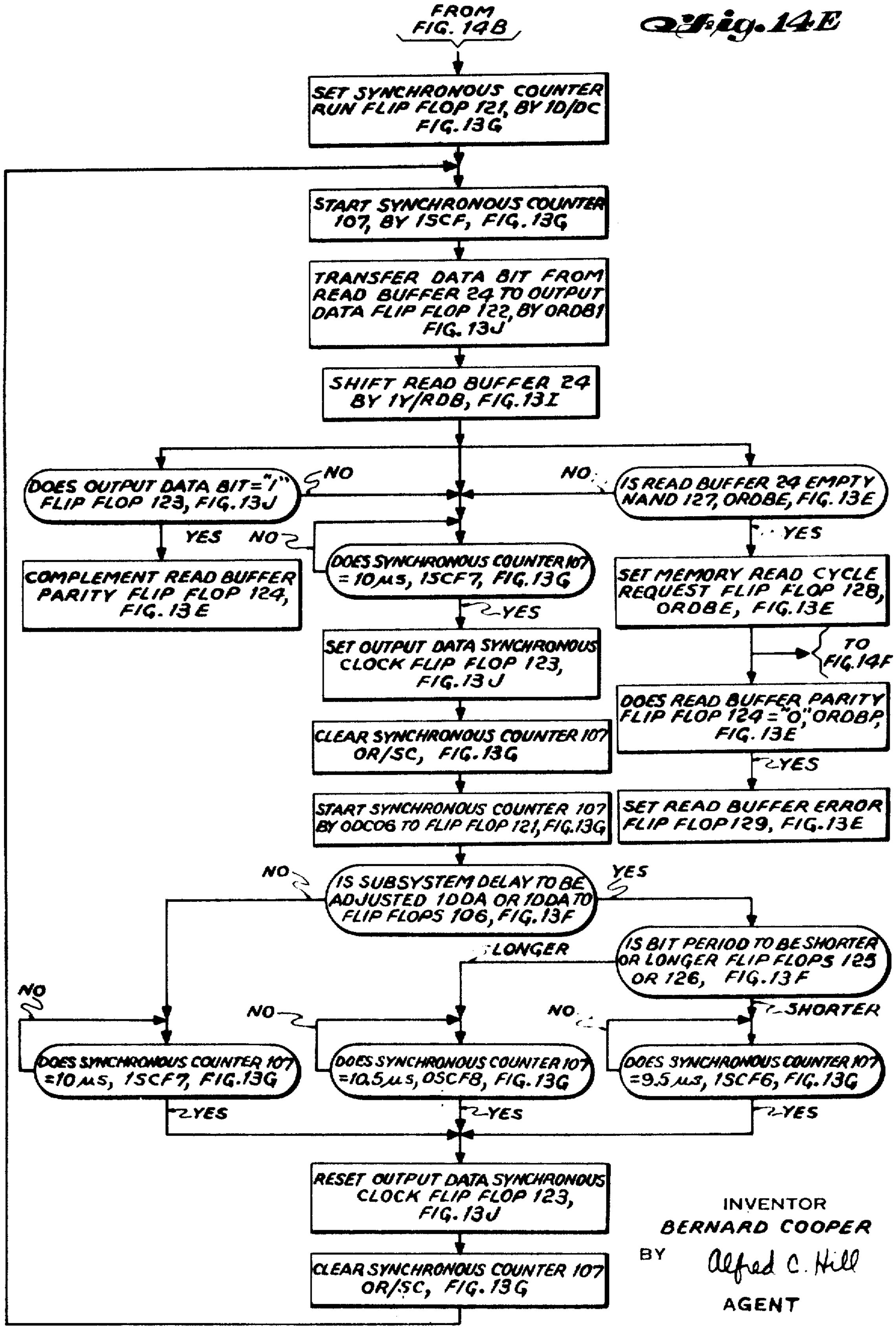

FIG. 14E describes the subsystems bit disassembly and delay adjustment process. As already described, the second decoded output of decoder 84, 10 microseconds before the expiration of the preset delay in counter 26, is used to place the first data bit on the output line and begin the bit disassembly process. With the receipt of the decoded output pulse from decoder 84, the synchronous counter run flip-flop 121, FIG. 13G is set to indicate a bit disassembly process, synchronous counter 107; FIG. 13G is started, read buffer 24 is shifted one position and the first output bit is placed in the output data flip-flop 83 (flip-flop 122, FIG. 13J). When synchronous counter has counted 10 microseconds, half of the output 50 KB/S data pulse has been generated and the output data synchronous clock flip-flop 123, FIG. 13J is set. Synchronous counter 107 is then cleared and restarted to time out the second half of the output pulse. Any system delay adjustment that may be required will take place during the second half of the output data bit period. If the subsystem delay is to be increased the output data bit period will be lengthened one system clock period (0.5 microseconds). In a similar manner, if the subsystem delay is to be decreased, the output data bit period will be shortened by one system clock period (0.5 microseconds). For the case where the subsystem delay adjustment is not required, the second half of the output bit period will be the normal 10 microseconds as determined by synchronous counter 107. In any case, when the output bit period is complete the output data synchronous clock flip-flop 123 is reset and synchronous counter 107 is cleared. With the completion of the first data bit, synchronous counter 107 is restarted and the second bit is placed in flip-flop 122. The disassembly of additional data bits will continue in an identical manner until eight data bits have been disassembled and read buffer 24 is empty. On placing all eight of the data bit in flip-flop 123, the read cycle request flip-flop 128, FIG. 13E is set and a memory read cycle will be performed as soon as the memory is free. The system timing is arranged so that a memory read cycle will occur before another data bit is required for disassembly. Synchronously with the shifting of each data bit into the output flip-flop 122, read data buffer parity flip-flop 124, FIG. 13E is complemented for each logical "1" data bit disassembled. Since the parity flip-flop 124 originally contained the odd parity read from memory 22, it should be in the set condition when all eight data bits of read buffer 24 have been disassembled. However, if the parity flip-flop 124 remains in the reset condition after read buffer 24 is emptied a parity error has occurred and the subsystems parity error flip-flop 129, FIG. 13E is set.

Figure 14F:
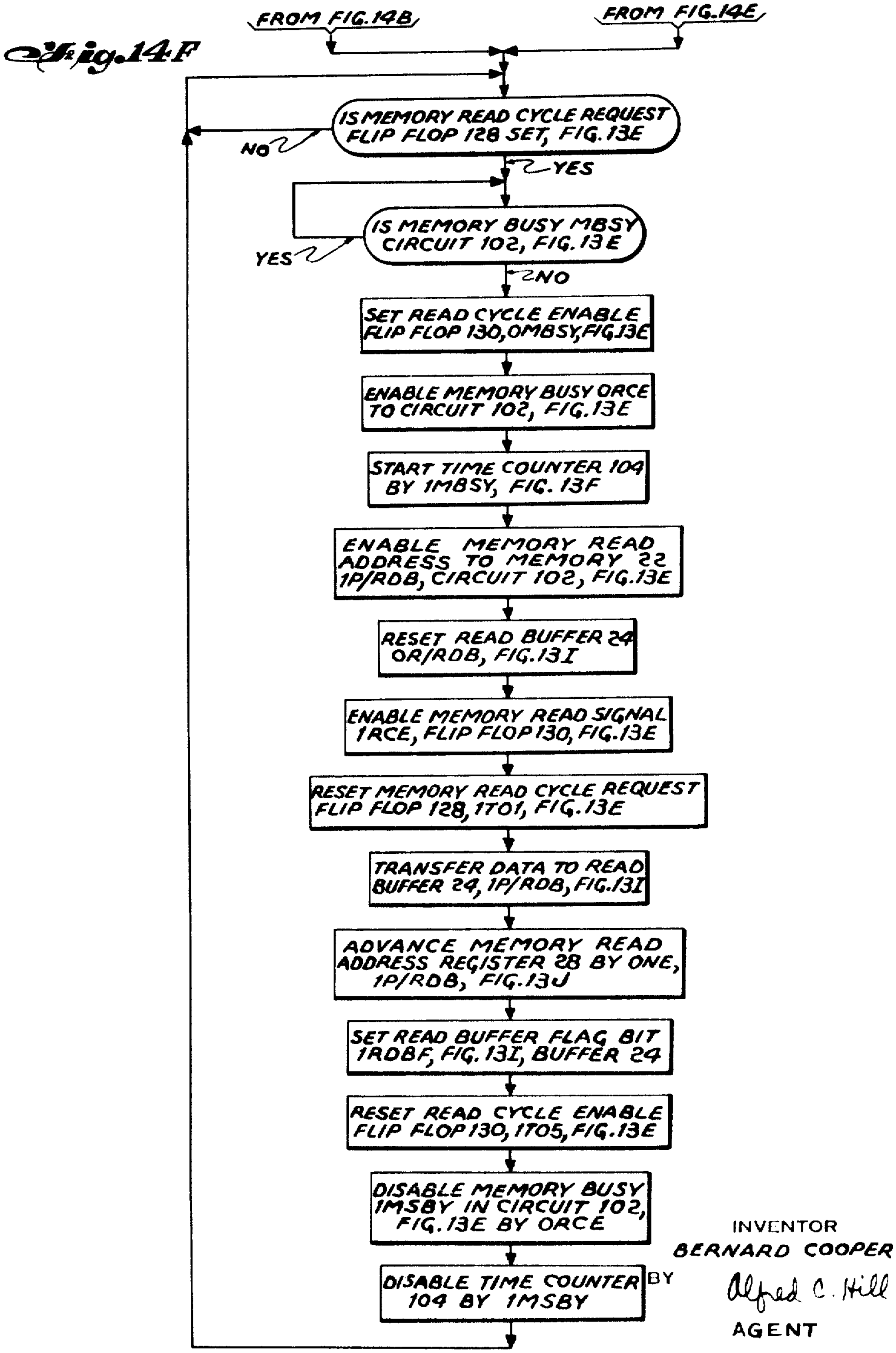

FIG. 14F describes the memory read cycle. As already described a memory read cycle may be requested in two ways. The first memory read cycle performed as initiated by decoder 84, 20 microseconds before the specified preset delay of counter 26 has expired. This read cycle is performed to ensure that data will be available in read buffer 25 for disassembly of the first bit. After the first cycle, each following memory read cycle is requested by the bit disassembly logic when read buffer 24 becomes empty. In both cases, when the memory is not busy, the read cycle flip-flop 130, FIG. 13E is set and the read cycle begun. At the start of the read cycle, the memory busy signal is enabled, time counter 104, FIG. 13F is started and the memory address contained in read register 28 is gated to memory 22 by memory address gate 100, FIG. 13D. During time count 01 the memory read signal is enabled, read buffer 24 is cleared and the read cycle request flip-flop 128, FIG. 13E is reset. During time count 05 the memory data is transferred to read buffer 24 and the flag bit is set. On the trailing edge of time count 05, read address register 28 is advanced by one, the address of the next read cycle is reset. With the reset of read cycle flip-flop 130 the memory busy signal is disabled, time counter 104 is disabled, and the memory control is again free to perform any cycle that may be requested.

While I have described above the principles of my invention in connection with specific apparatus, it is to be clearly understood that this description is made only by way of example and not as a limitation to the scope of my invention as set forth in the objects thereof and in the accompanying claims.

I claim:

1. A satellite communication system comprising:
at least a first satellite; and
at least a first terminal disposed in communication relationship with said first satellite establishing at least a first communication path between said first terminal and said first satellite;
said first terminal including
a first source of a first digital data bit stream,
first means coupled to said first source capable of controlling the time delay of said first stream prior to transmission to said first satellite,
second means coupled to said first source capable of controlling the time delay of said first stream, and
third means, coupled to said second means, said first means and said first communication path, responsive to said first stream from said second means and said first stream received from said first satellite on said first communication path for controlling said first and second means to maintain the time of transmission through said first communication path constant.

2. A system according to claim 1, wherein
said first and second means each include a variable time delay means.

3. A system according to claim 2, wherein
each of said time delay means include magnetic core storage means.

4. A system according to claim 2, wherein
each of said time delay means include a bistable device to provide as the output therefrom
said first stream having the width of the data bits thereof varied to control the time delay of said first stream and maintain the time of transmission through said first communication path constant.

5. A system according to claim 1, wherein
said first means includes a first variable time delay means; and
said second means includes a second variable time delay means;
said third means adding a time delay to one of said first and second time delay means and deleting a corresponding time delay from the other of said first and second time delay means.

6. A system according to claim 5, wherein
each of said first and second time delay means include magnetic core storage means, and
a bistable device coupled to said storage means and said third means to provide at the output thereof said first stream having the width of the data bits thereof varied to control the time delay of said first stream and maintain the time of transmission through first communication path constant.

7. A system according to claim 1, wherein
said third means includes
autocorrelation means responsive to said first stream from said second means and said first stream received from said first satellite for controlling said first and second means to maintain the time of transmission through said first communication path constant.

8. A system according to claim 7, wherein
said autocorrelation means includes at least one NEGATIVE EXCLUSIVE -OR circuit.

9. A system according to claim 1, wherein
said third means includes
a first fixed time delay means having a given time delay coupled to said second means,
a second fixed time delay means having a time delay equal to twice said given time delay coupled to said first communication path,
a first digital multiplier coupled to said first and second fixed delay means,
a second digital multiplier coupled to said first fixed delay means and said first communication path,
a first analog integrator coupled to said first multiplier,
a second analog integrator coupled to said second multiplier,
differential means coupled to said first and second integrators, and positive and negative threshold means coupled to said differential means to produce an output to control said first and second means.

10. A system according to claim 9, wherein
said first and second multipliers each include an AND circuit.

11. A system according to claim 9, wherein
said first and second multipliers each include a NEGATIVE EXCLUSIVE-OR circuit.

12. A system according to claim 1, wherein each of said first and second means include
magnetic core storage means, and
a bistable device, coupled to said storage means, to provide at the output thereof said first stream having the width of the data bits thereof varied to control the time delay of said first stream and maintain the time of transmission through said first communication path constant; and said third means includes
a first fixed time delay means having a given time delay coupled to the output of said bistable device of said second means,
a second fixed time delay means having a time delay equal to twice said given time delay coupled to said first communication path,
a first digital multiplier coupled to said first fixed delay means and said second fixed delay means,
a second digital multiplier coupled to said first fixed delay means and said first communication path,
a first analog integrator coupled to said first multiplier,
a second analog integrator coupled to said second multiplier,
differential means coupled to said first and second integrators, and
positive and negative threshold means coupled to said differential means to produce an output to control said bistable device of each of said first and second means.

13. A system according to claim 1, wherein said first terminal further includes
fourth means coupled to said first satellite establishing a second communication path between said first satellite and said first terminal for a second digital data bit stream, and
fifth means coupled to said fourth means and said third means responsive to the output of said third means to control the time delay of said second stream at the output of said fifth means to maintain the time of transmission through said second communication path constant and equal to the time of transmission through said first communication path.

14. A system according to claim 13, wherein
said fifth means includes a variable time delay means.

15. A system according to claim 14, wherein
said time delay means includes magnetic core storage means coupled to said fourth means and
a bistable device coupled to said storage means and said third means to provide at the output thereof said second stream having the width of the data bits thereof varied to control the time delay of said second stream and maintain the time of transmission through said second communication path constant.

16. A system according to claim 1, further comprising a second satellite in communication relationship with said first terminal establishing a second communication path between said first terminal and said second satellite; and
said first terminal further including
fourth means to provide a second digital data bit stream,
fifth means coupled to said fourth means capable of controlling the time delay of said second stream prior to transmission to said second satellite,
sixth means coupled to said fourth means capable of controlling the time delay of said second stream,
seventh means, coupled to said sixth means, fifth means and said second communication path responsive to said second stream from said sixth means and said second stream received from said second satellite on said second communication path for controlling said fifth and sixth means to maintain the time of transmission through said second communication path constant and equal to the time of transmission through said first communication path, and
eighth means coupled to said first source, said first and second means and said fifth and sixth means to transfer said first stream from said first communication path to said second communication path.

17. A system according to claim 16, wherein
said fourth means is said first source and said second stream is said first stream.

18. A system according to claim 16, wherein
said first terminal further includes a first utilization device,
ninth means in communication relation said first satellite establishing a third communication path between said first satellite and said first terminal for a third digital data bit stream,
tenth means coupled to said ninth means and said third means responsive to the output of said third means to control the time delay of said third stream at the output of said tenth means to maintain the time of transmission through said third communication path constant and equal to the time of transmission through said first communication path,
eleventh means in communication with said second satellite establishing a fourth communication path between said second satellite and said first terminal for said third stream, twelfth means coupled to said eleventh means and said seventh means responsive to the output of said seventh means to control the time delay of said third stream at the output of said twelfth means to maintain the time of transmission through said fourth communication path constant and equal to said third communication path, and said eighth means is coupled to said tenth and twelfth means and said first utilization device to transfer the input to said first utilization device from said tenth means to said twelfth means simultaneously with the transfer of said first stream from said first communication path to said second communication path.

19. A system according to claim 18, further comprising a second terminal including a second source of said third stream, a second utilization device and means identical to said first, second, third, fourth, fifth, sixth, seventh, eighth, ninth, tenth, eleventh and twelfth means to enable two-way communication with said first terminal through one of said first and second satellites.

20. A system according to claim 1, wherein said first and second means each include backward counting digital counting means and means coupled to said counting means to preset said counting means to a count corresponding to the range between said first satellite and said first terminal to bring the time delay of said first stream coupled from said second means to said third means and the time delay of said first stream received from said first satellite on said first satellite on said first communication path by said third means within the time delay control range of said third means.

21. In a satellite communication system, a variable time delay system comprising:

a first source of a digital data bit stream;

a first digital variable time delay means coupled to said first source a second digital variable time delay means coupled to said first source a second source of said data stream having a varying time relationship with respect to said stream at the output of said first source; and digital-analog autocorrelation means, coupled to said first delay means, said second delay means and said second source, responsive to said data stream from both said second delay means and said second source to control the time delay of said first delay means and said second delay means to maintain said data stream from said delay means time coincident with said data stream from said second source.

22. A system according to claim 21, wherein said variable delay means includes magnetic core storage means.

23. A system according to claim 21, wherein said variable delay means includes a bistable device to provide as the output therefrom said data stream having the width of the data bits thereof varied to control the time delay of said data stream.

24. A system according to claim 21, wherein said autocorrelation means includes a first fixed time delay means having a given time delay coupled to said variable delay means, a second fixed time delay means having a time delay equal to twice said given time delay coupled to said second source, a first digital multiplier coupled to said first and second fixed delay means, a second digital multiplier coupled to said first fixed delay means and said second source, a first analog integrator coupled to said first multiplier, a second analog integrator coupled to said second multiplier, differential means coupled to said first and second integrators, and positive and negative threshold means coupled to said differential means to produce an output to control said variable delay means.

25. A system according to claim 24, wherein each of said first and second multipliers include an AND circuit.

26. A system according to claim 24, wherein each of said first and second multipliers include a NEGATIVE EXCLUSIVE-OR circuit.

27. A system according to claim 21, wherein said variable delay means includes magnetic core storage means, and a bistable device, coupled to said storage means, to provide at the output thereof said data stream having the width of the data bits thereof varied to control the time delay of said data stream; and said autocorrelator includes a first fixed time delay means having a given time delay coupled to the output of said bistable device, a second fixed time delay means having a time delay equal to twice said given time delay coupled to said second source, a first digital multiplier coupled to said first and second fixed delay means, a second digital multiplier coupled to said first fixed delay means and said second source, a first analog integrator coupled to said first multiplier, a second analog integrator coupled to said second multiplier, differential means coupled to said first and second integrators, and positive and negative threshold means coupled to said differential means to produce an output to control said bistable device.

28. A system according to claim 21, wherein said variable time delay means include backward counting digital-counting means, and means coupled to said counting means to preset said counting means to a given count to bring the time delay of said data stream coupled from said delay means to said autocorrelation means and the time delay of said data stream coupled from said second source to said autocorrelation means within the time delay control range of said autocorrelation means.